US012590245B2

(12) United States Patent
Lin et al.

(10) Patent No.: US 12,590,245 B2
(45) Date of Patent: Mar. 31, 2026

(54) LONG-PERSISTENT LUMINESCENCE EMITTER AND LONG-PERSISTENT LUMINESCENT DEVICE

(71) Applicant: Okinawa Institute of Science and Technology School Corporation, Onna-son (JP)

(72) Inventors: Zesen Lin, Onna-son (JP); Ryota Kabe, Onna-son (JP)

(73) Assignee: Okinawa Institute of Science and Technology School Corporation, Onna-son (JP)

( * ) Notice: Subject to any disclaimer, the term of this patent is extended or adjusted under 35 U.S.C. 154(b) by 765 days.

(21) Appl. No.: 17/822,223

(22) Filed: Aug. 25, 2022

(65) Prior Publication Data

US 2023/0101415 A1 Mar. 30, 2023

(30) Foreign Application Priority Data

Aug. 30, 2021 (JP) ................................ 2021-139601

(51) Int. Cl.

*C08F 220/30* (2006.01)
*C08F 220/34* (2006.01)
*C09K 11/06* (2006.01)
*C08F 220/26* (2006.01)

(52) U.S. Cl.

CPC .......... *C09K 11/06* (2013.01); *C08F 220/302* (2020.02); *C08F 220/34* (2013.01); *C08F 220/26* (2013.01); *C08F 220/30* (2013.01); *C08F 2800/10* (2013.01); *C09K 2211/1425* (2013.01); *C09K 2211/145* (2013.01); *C09K 2211/1466* (2013.01)

(58) Field of Classification Search

CPC .... C08F 224/00; C08F 226/06; C08F 226/12; C08F 220/10; C08F 220/26; C08F 220/30; C08F 220/34; H01L 25/00

See application file for complete search history.

(56) References Cited

U.S. PATENT DOCUMENTS

| | | | | |
|---|---|---|---|---|
| 10,301,540 | B2 * | 5/2019 | Kabe | C09K 11/06 |
| 10,636,974 | B2 * | 4/2020 | Campos | H10K 85/113 |
| 12,096,685 | B2 * | 9/2024 | Jinnai | H10K 85/6572 |
| 2020/0165516 | A1 | 5/2020 | Kabe et al. | |
| 2020/0377534 | A1 | 12/2020 | Tang et al. | |
| 2022/0243122 | A1 * | 8/2022 | Jinnai | H10K 85/633 |

FOREIGN PATENT DOCUMENTS

| | | | | |
|---|---|---|---|---|
| CN | 111234083 A | | 6/2020 | |
| CN | 111363124 A | * | 7/2020 | C08G 61/12 |
| JP | 2006206618 | | 1/2005 | |
| JP | 2020129562 A | * | 8/2020 | C09K 11/06 |
| JP | 2020129652 A | | 8/2020 | |
| JP | 2021031621 A | | 3/2021 | |
| WO | WO-2016105533 A1 | * | 6/2016 | C08G 61/126 |
| WO | 2018105633 | | 12/2017 | |
| WO | 2019031524 A1 | | 2/2019 | |
| WO | 2019189045 A1 | | 10/2019 | |

OTHER PUBLICATIONS

CN 11363124 A (Jul. 3, 2020); machine translation. (Year: 2020).*
JP 2020129562 A (Aug. 27, 2020); machine translation. (Year: 2020).*
Lin, Z.; Kabe, R.; Nishimura, N.; Jinnai, K.; Adachi, C. Adv. Mater. 2018, 30, 1803713. (Year: 2018).*
Kabe, R.; Adachi, C. Nature Oct. 19, 2017, vol. 550, 384-387. (Year: 2017).*
Jinnai, K.; Nishimura, N.; Kabe, R.; Adachi, C. Chem. Lett. 2019, 48, 270-273. (Year: 2019).*
Jinnai, K., Kabe, R.; Adachi, C. Adv. Mater. 2018, 30, 1800365. (Year: 2018).*
Office Action dated Mar. 5, 2025 issued in the corresponding Japanese patent application No. 2021-139601 with its English Machine Translation.

* cited by examiner

*Primary Examiner* — Rip A Lee
(74) *Attorney, Agent, or Firm* — Troutman Pepper Locke LLP; James E. Armstrong, IV

(57) ABSTRACT

A long-persistent luminescence emitter containing a polymer that contains, relative to the total molar amount of an electron donor structural unit and an electron acceptor structural unit therein, 70 mol % or more of an electron donor structural unit and less than 30 mol % of an electron acceptor structural unit, or containing a polymer that contains, relative to the total molar amount of an electron donor structural unit and an electron acceptor structural unit therein. 70 mol % or more of an electron acceptor structural unit and less than 30 mol % of an electron donor structural unit. The emission decay after stopping light irradiation to the emitter is power law decay.

9 Claims, 1 Drawing Sheet

LONG-PERSISTENT LUMINESCENCE EMITTER AND LONG-PERSISTENT LUMINESCENT DEVICE

TECHNICAL FIELD

The present invention relates to a polymer-type long-persistent luminescence emitter and a long-persistent luminescent device using the long-persistent luminescence emitter.

BACKGROUND ART

Long-persistent luminescent materials are luminescent materials which store energy during application of excitation light and emit light using the stored energy even after the application of excitation light has stopped. Long-persistent luminescent materials are used as luminescent paints for watch and clock dials which glow in the dark or at night, letters and diagrams of signs and guideboards and the like, and these materials have been recently applied to lights which can produce light with stored light energy without electricity supply.

Of these long-persistent luminescent materials, inorganic salts containing rare earth elements such as Eu, Ce and Tb are especially known as long-persistent luminescent materials which exhibit long-lived luminescence (for example, see PTL 1).

CITATION LIST

Patent Literature

PTL 1: JP 2006-206618 A

PTL 2: WO2018/105633A1

The long-persistent luminescent materials composed of inorganic salts (inorganic long-persistent luminescent materials), however, have the following problems: they contain a rare earth element, they require a high-temperature process, and they are insoluble in solvent.

Consequently, an organic long-persistent luminescent material prepared by mixing an electron-donating organic molecule and an electron-accepting organic molecule (see PTL 2). The organic long-persistent luminescent material does not contain a rare metal such as a rare earth element and, in addition, can be prepared by a simple method of mixing two kinds of organic molecules, and therefore has an advantage of high general versatility as compared with an inorganic long-persistent luminescent material.

However, the present inventors have made further studies about the organic long-persistent luminescent material and have found the following problems: In general, an electron donor molecule and an electron acceptor molecule differ in physical properties such as melting point and mechanical properties, and therefore, when these are mixed, there may occur some problems in that the molecules may aggregate to form lumps or may undergo phase separation, and therefore a uniform long-persistent luminescent material is difficult to produce.

Given the situation, the inventors have advanced further assiduous studies for the purpose of realizing long-persistent luminescence emission with a single kind of component.

Solution to Problem

As a result of assiduous investigations, the inventors have found that a polymer produced by polymerization of an electron donor molecule and an electron acceptor molecule in a predetermined ratio, which shows predetermined electron transfer and emission decay behavior, can show long-persistent luminescence emission with a single kind of polymer. The present invention has been proposed based on such findings and has the following configurations.

[1] A long-persistent luminescence emitter capable of emitting light for 0.1 seconds or longer after stopping light irradiation to the emitter, the emitter containing a polymer that contains, relative to the total molar amount of an electron donor structural unit and an electron acceptor structural unit therein, 70 mol % or more of an electron donor structural unit and less than 30 mol % of an electron acceptor structural unit, or containing a polymer that contains, relative to the total molar amount of an electron donor structural unit and an electron acceptor structural unit therein, 70 mol % or more of an electron acceptor structural unit and less than 30 mol % of an electron donor structural unit, wherein an electron transfer from the electron donor structural unit to the electron acceptor structural unit occurs by light irradiation to the emitter, and the emission decay after stopping light irradiation to the emitter is power law decay.

[2] The long-persistent luminescence emitter according to [1], wherein the polymer is a random copolymer.

[3] The long-persistent luminescence emitter according to [1] or [2], wherein the donor structural unit contains a diarylamine structure.

[4] The long-persistent luminescence emitter according to any one of [1] to [3], wherein the donor structural unit contains a substituted or unsubstituted carbazolyl group.

[5] The long-persistent luminescence emitter according to any one of [1] to [4], wherein the acceptor structural unit contains a π-electron-deficient aromatic heterocycle.

[6] The long-persistent luminescence emitter according to any one of [1] to [5], wherein the acceptor structural unit contains a pyrylium ring.

[7] The long-persistent luminescence emitter according to any one of [1] to [6], wherein the polymer contains 70 mol % or more of the electron donor structural unit and less than 30 mol % of the electron acceptor structural unit relative to the total molar amount thereof, and further contains a hole trapping structural unit.

[8] The long-persistent luminescence emitter according to any one of [1] to [6], wherein the polymer contains 70 mol % or more of the electron acceptor structural unit and less than 30 mol % of the electron donor structural unit relative to the total molar amount thereof, and further contains an electron trapping structural unit.

[9] Use of a polymer as a long-persistent luminescence emitter that emits light for 0.1 seconds or longer after stopping light irradiation to the emitter, wherein the polymer contains, relative to the total molar amount of an electron donor structural unit and an electron acceptor structural unit therein, 70 mol % or more of an electron donor structural unit and less than 30 mol % of an electron acceptor structural unit, or contains, relative to the total molar amount of an electron donor structural unit and an electron acceptor structural unit therein, 70 mol % or more of an electron acceptor structural unit and less than 30 mol % of an electron donor structural unit, and wherein an electron transfer from the electron donor structural unit to the electron acceptor structural unit occurs by light irradiation to the polymer, and the emission decay after stopping light irradiation to the polymer is power law decay.

[10] A long-persistent luminescence device having the long-persistent luminescence emitter of any one of [1] to [8] on a support.

Advantageous Effects of Invention

The long-persistent luminescence emitter of the present invention can realize long-persistent luminescence emission with a single kind of polymer. Using the long-persistent luminescence emitter, an organic long-persistent luminescent device can be produced easily.

DESCRIPTION OF EMBODIMENTS

Figure 1:
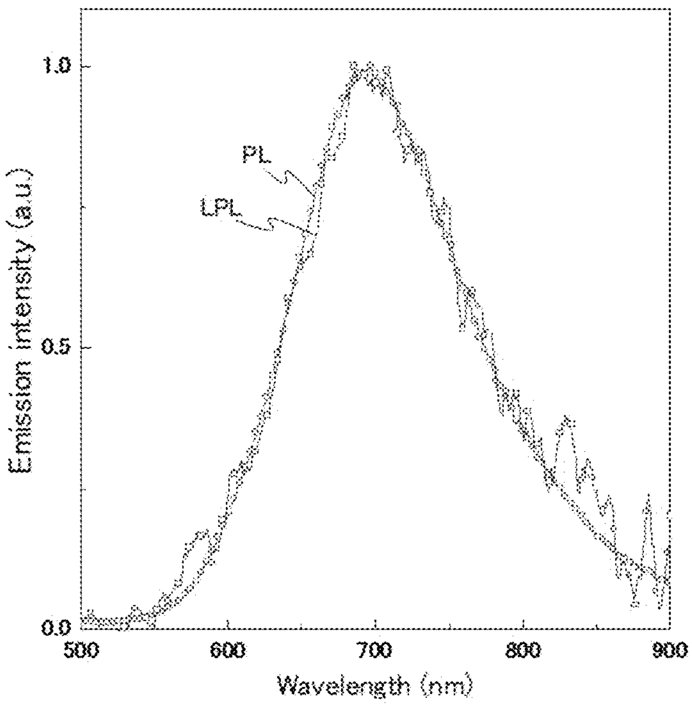
FIG. 1 A photoluminescence spectrum (PL) of a polymer while irradiated with excitation light, and a long-persistent luminescence spectrum (LPL) thereof after stopping irradiation with excitation light.

The contents of the invention are explained in detail below. Although the explanations of the constituent features described below are sometimes given based on typical embodiments or specific examples of the invention, the invention is not limited to the embodiments or the specific examples. A range indicated using "to" in this description means a range which includes the values before and after "to" as the lower limit and the upper limit, respectively. The kind of isotope of a hydrogen atom present in the molecule of a compound used in the invention is not particularly limited. For example, all the hydrogen atoms in a molecule may be $^1H$, or a part or all of the hydrogen atoms may be 2H (deuterium D).

The "room temperature" in this description means 20° C.

In this description, "excitation light" is a light to excite a targeted substance to provide light emission, and for this, a light whose wavelength correspond to the absorption wavelength of the targeted substance can be used.

An "electron-accepting group" in this description means a substituent with a positive Hammett $\sigma_p$ value, and an "electron-donating group" means a substituent with a negative Hammett $\sigma_p$ value. For the explanations of Hammett $\sigma_p$ values and the values of specific substituents, the descriptions of $\sigma_p$ values in Hansch, C. et. al., Chem. Rev., 91, 165-195 (1991) can be referred to.

The "energy level of LUMO (lowest unoccupied molecular orbital)" in this description is a value obtained from the reduction potential (CV) measured in cyclic voltammetry, and the "energy level of HOMO (highest occupied molecular orbital)" is a value measured in photoelectric spectroscopy or cyclic voltammetry. The targeted substance in measuring the energy level of LUMO and the energy level of HOMO of an electron donor structural unit is a compound corresponding to the electron donor structural unit, and the targeted substance in measuring the energy level of LUMO and the energy level of HOMO of an electron acceptor structural unit is a compound corresponding to the electron acceptor structural unit. Here, the "compound corresponding to the electron donor structural unit" is a compound to be derived from the electron donor structural unit by replacing the units-linking group of the unit to a hydrogen atom, and the "compound corresponding to the electron acceptor structural unit" is a compound to be derived from the electron acceptor structural unit by replacing the units-linking group of the unit to a hydrogen atom. Regarding the "units-linking group", reference can be made to the corresponding description in the sections (First Structural Unit Group) and (Second Structural Unit Group).

<Long-Persistent Luminescence Emitter>

The long-persistent luminescence emitter of the present invention is a long-persistent luminescence emitter capable of emitting light for 0.1 seconds or longer after stopping light irradiation to the emitter, and the emitter contains a polymer that contains, relative to the total molar amount of an electron donor structural unit and an electron acceptor structural unit therein, 70 mol % or more of an electron donor structural unit and less than 30 mol % of an electron acceptor structural unit, or contains a polymer that contains, relative to the total molar amount of an electron donor structural unit and an electron acceptor structural unit therein, 70 mol % or more of an electron acceptor structural unit and less than 30 mol % of an electron donor structural unit, wherein an electron transfer from the electron donor structural unit to the electron acceptor structural unit occurs by light irradiation to the emitter, and the emission decay after stopping light irradiation to the emitter is power law decay.

In the following description, of the polymers for use in the long-persistent luminescence emitter of the present invention, the "polymer that contains, relative to the total molar amount of an electron donor structural unit and an electron acceptor structural unit therein, 70 mol % or more of an electron donor structural unit and less than 30 mol % of an electron acceptor structural unit" is referred to as "a first polymer", and the "polymer that contains, relative to the total molar amount of an electron donor structural unit and an electron acceptor structural unit therein, 70 mol % or more of an electron acceptor structural unit and less than 30 mol % of an electron donor structural unit" is as "a second polymer".

"Light irradiation" in "light irradiation to the emitter" in the present invention means that the long-persistent luminescence emitter is irradiated with excitation light. Emission from the long-persistent luminescence emitter after stopping light irradiation thereto can be detected, for example, using a spectrometer (PMA-50, by Hamamatsu Photonics KK). The emission intensity of less than 0.01 $mcd/m^2$ can be considered as undetectable. In the present description, emission from the long-persistent luminescence emitter after stopping light irradiation thereto may be referred to as "persistent luminescence", and the length of time from the point at which light irradiation stops to the point at which the emission intensity can no longer be detected is sometimes called "persistent luminescence duration time". The persistent luminescence duration time of the long-persistent luminescence emitter of the present invention is preferably 1 second or longer, more preferably 5 seconds or longer, even more preferably 5 minutes or longer, further more preferably 20 minutes or longer.

In the present invention, the "polymer" means a compound having at least four structural units. Here, the "structural unit" is an atomic group derived from a raw monomer for the polymer.

The "electron donor structural unit" in the present invention means a structural unit capable of releasing an electron in association with light irradiation to the long-persistent luminescence emitter, and the "electron acceptor structural unit" in the present invention means a structural unit capable of receiving the electron released from the electron donor structural unit.

The "emission decay is power law decay" means that the relationship between the emission intensity I(t) after stopping light irradiation to the long-persistent luminescence emitter and the elapse time t satisfy the following relational formula. In the following formula, $I_0$ is an emission intensity at the time of stopping the light irradiation, and a and m are constants. In general, a long-persistent luminescence emitter that may undergo power law decay has a region of a straight line in the double logarithmic graph in which a logarithm of the emission intensity I(t) is plotted on the vertical axis and a logarithm of the elapse time t is on the horizontal axis.

$$I(t) = \frac{I_0}{(1+\alpha t)^m}$$

The long-persistent luminescence emitter containing a first polymer and a second polymer as mentioned above can realize long-persistent luminescence with a single kind of polymer. It is presumed that this is because of the following light emission mechanism. However, the emission mechanism of the long-persistent luminescence emitter of the present invention should not be limitatively interpreted by the emission mechanism described below.

Namely, in the polymer containing the electron donor structural unit and the electron acceptor structural unit as mentioned above, an electron transfer from the electron donor structural unit to the electron acceptor structural unit occurs by light irradiation to the long-persistent luminescence emitter. The electron transfer occurs, for example, in a process where the electron acceptor structural unit absorbs light and an electron transitions from HOMO to LUMO, and the electron of HOMO of the electron donor structural unit transfers to the hole of HOMO to cause transition to LUMO, or in a process where an electron directly transfers to LUMO of an electron acceptor structural unit from HOMO of an electron donor structural unit by light absorption. As a result of the electron transfer, a charge transfer state is formed that contains an electron donor structural unit having a hole formed in HOMO and an electron acceptor structural unit having an electron injected into LUMO.

At that time, in the first polymer, the proportion of the electron donor structural unit is larger than the proportion of the electron acceptor structural unit, and therefore the hole formed in the electron donor structural unit can readily transfer to HOMO of the neighbor electron donor structural unit, and further, the transferred hole transfers to HOMO of the neighbor electron donor structural unit. Thus, the HOMO-to-HOMO transfer process is repeated for multi-stage transfer, and there occurs a charge separation state where the hole is separated from the electron of LUMO. Afterwards, the hole in a charge separation state can encounter the electron acceptor structural unit having an electron injected in LUMO in the multi-stage transfer process via HOMO, and the electron and the hole are recombined (carrier recombination) to emit light. In the long-persistent luminescence emitter using the first polymer, the multi-stage transfer of hole and carrier recombination continuously occur even after stopping light irradiation to the emitter, and accordingly the emitter exhibits persistent luminescence.

On the other hand, in the second polymer, the proportion of the electron acceptor structural unit is larger than the proportion of the electron donor structural unit, and therefore the electron entered LUMO of the electron acceptor structural unit can readily transfer to LUMO of the neighbor electron acceptor structural unit, and further, the transferred electron transfers to LUMO of the neighbor electron acceptor structural unit. Thus, the LUMO-to-LUMO transfer process is repeated for multi-stage transfer, and there occurs a charge separation state where the electron of LUMO is separated from hole. Afterwards, the electron in a charge separation state can encounter the electron donor structural unit having a hole formed in HOMO in the multi-stage transfer process via LUMO, and the hole and the electron are recombined (carrier recombination) to emit light. In the long-persistent luminescence emitter using the second polymer, the multi-stage transfer of electron and carrier recombination continuously occur even after stopping light irradiation to the emitter, and accordingly the emitter exhibits persistent luminescence.

According to the above-mentioned emission mechanism, the long-persistent luminescence emitter of the present invention can realize long-persistent luminescence emission with a single kind of the first polymer or the second polymer.

Of the polymer for use in the long-persistent luminescence emitter of the present invention, preferably, the electron donor structural unit and the electron acceptor structural unit satisfy the following formula (1).

$$LUMO_1 > LUMO_2 \quad \text{Formula (1)}$$

In the formula (1), $LUMO_1$ represents an energy level of LUMO of the electron donor structural unit, and $LUMO_2$ represents an energy level of LUMO of the electron acceptor structural unit.

By combining the electron donor structural unit and the electron acceptor structural unit so as to satisfy the formula (1) in designing the configuration of the polymer, more excellent persistent luminescence characteristics can be attained. It is presumed that this is because of the following mechanism.

Namely, in the case where the energy level of LUMO of the electron donor structural unit is higher than the energy level of LUMO of the electron acceptor structural unit, the electron taken in LUMO of the electron acceptor structural unit can hardly transfer to LUMO of the electron donor structural unit, and therefore holes and electrons are inhibited from being early recombined on the electron donor structural unit to provide light emission, and further the electron of LUMO can readily transfer to LUMO of the neighbor electron acceptor structural unit to be in a charge separation state. Consequently, by combining the electron donor structural unit and the electron acceptor structural unit satisfying the formula (1) to design the configuration of the polymer, persistent luminescence characteristics such as persistent luminescence duration time can be improved.

In the following, the configuration of the polymer for use in the present invention is described more specifically.

[Polymer]

The polymer for use in the present invention is a first polymer that containing, relative to the total molar amount of an electron donor structural unit and an electron acceptor structural unit therein, 70 mol % or more of an electron donor structural unit and less than 30 mol % of an electron acceptor structural unit, or a second polymer containing, relative to the total molar amount as above, 70 mol % or more of an electron acceptor structural unit and less than 30 mol % of an electron donor structural unit. The first polymer and the second polymer have the same configuration except that the proportion of the electron donor structural unit and that of the electron acceptor structural unit therein differ between them. Consequently, the description relating to the polymer given hereinunder shall apply to both the first polymer and the second polymer except the description given in the section of (Proportion of Electron Donor Structural Unit and Electron Acceptor Structural Unit).

(Electron Donor Structural Unit)

The electron donor structural unit is a structural unit capable of releasing electrons in association with light irradiation to the long-persistent luminescence emitter. In a preferred embodiment of the present invention, the electron donor structural unit can release an electron from HOMO in association with light irradiation to the long-persistent luminescence emitter. Preferably, of the electron donor structural unit, the energy level of HOMO is higher than that of the electron acceptor structural unit. This facilitates electron transfer from HOMO of the electron donor structural unit to HOMO or LUMO of the electron acceptor structural unit to efficiently provide a charge separation state. In addition, the energy level of HOMO of the electron donor structural unit is preferably −3.5 to −8.0 eV, more preferably −4.0 to −7.0 eV, even more preferably −4.5 to −6.0 eV.

Also as described above, the energy level of LUMO of the electron donor structural unit is preferably higher than that of the electron acceptor structural unit. Specifically, the difference ($LUMO_1$−$LUMO_2$) between the energy level of LUMO of the electron donor structural unit ($LUMO_1$) and the energy level of LUMO of the electron acceptor structural unit ($LUMO_2$) is preferably more than 0 eV and 4 eV or less, more preferably 0.01 to 3 eV, even more preferably 0.1 to 2 eV. With that, the persistent luminescence characteristics of the long-persistent luminescence emitter can be more surely improved.

(Electron Acceptor Structural Unit)

The electron acceptor structural unit is a structural unit capable of receiving the electron released from the electron donor structural unit. In a preferred embodiment of the present invention, after the electron acceptor structural unit has received the electron released from the electron donor structural unit, in the hole of HOMO formed in electron transition between HOMO-LUMO, the electron can be transitioned to LUMO. Also in another preferred embodiment of the present invention, the electron acceptor structural unit can receive the electron released from the electron donor structural unit, directly in LUMO thereof.

The gap of HOMO and LUMO of the electron acceptor structural unit is preferably 1.0 to 3.5 eV, more preferably 1.5 to 3.4 eV, even more preferably 2.0 to 3.3 eV. With that, electron transition from HOMO to LUMO can efficiently occur in association with light irradiation to the long-persistent luminescence emitter. In addition, by appropriately controlling the energy level of LUMO of the electron acceptor structural unit ($LUMO_2$), electron transfer from HOMO to LUMO of the electron acceptor structural unit can be easy and a longer persistent luminescence duration time can be realized.

Structural Unit Usable as Electron Donor Structural Unit and Electron Acceptor Structural Unit The electron donor structural unit can be composed of an atomic group having electron donor performance, and a units-linking group that links the atomic group to the neighbor structural unit, and the electron acceptor structural unit can be composed of an atomic group having electron acceptor performance, and a units-linking group that links the atomic group to the neighbor structural unit. The units-linking group is a linking group having a structure derived from the polymerizable group of a raw monomer of each structural unit. Preferably, the electron donor structural unit and the electron acceptor structural unit do not contain a rare earth atom and a metal atom, and more preferably, the units are composed of atoms alone selected from carbon, hydrogen, nitrogen, oxygen, sulfur and phosphorus.

In the following, regarding the structural unit group usable as the structural units of the polymer, a first structural unit group and a second structural unit group are described. From the "first structural unit group", the electron donor structural unit can be selected, and from the "second structural unit group", the electron acceptor structural unit can be selected, or from the "first structural unit group", the electron donor structural unit and the electron acceptor structural unit can be selected.

A preferred combination of the electron donor structural unit and the electron acceptor structural unit includes a combination where the electron donor structural unit is a structural unit having an electron donating group, and the electron acceptor structural unit is a structural unit having an electron-accepting group, and a combination where the electron donor structural unit is a structural unit having an electron donating group, and the electron acceptor structural unit is also a structural unit having an electron donating group. A more preferred combination includes a combination where the donor structural unit is a structural unit having a diarylamine structure and the acceptor structural unit is a structural unit having a π-electron deficient aromatic heterocycle, and an even more preferred combination is a combination where the donor structural unit is a structural unit having a carbazole ring and the acceptor structural unit is a structural unit having a pyrylium ring.

(First Structural Unit Group)

The structural unit contained in the first structural unit group includes a structural unit that contains an electron donating group-containing atomic group and a units-linking group that links the atomic group to the neighbor structural unit. In the following description, the "electron donating group-containing atomic group" that the structural unit of the first structural unit group contains may be referred to as "first atomic group". The first atomic group is preferably an atomic group having an electron-donating group and a conjugated system, and is more preferably an atomic group having a dialkylamino group and an aromatic ring, or an atomic group having an arylamine structure.

In the atomic group having a dialkylamino group and an aromatic ring, the aromatic ring can be an aromatic hydrocarbon or an aromatic heterocycle but is preferably an aromatic hydrocarbon. Regarding the description and the preferred range of the aromatic hydrocarbon, reference can be made to the description and the preferred range of the aromatic ring to constitute an arylene group in the case where $Ar^{15}$ and $Ar^{16}$ mentioned below are each a substituted or unsubstituted arylene group. Regarding the description and the preferred range of the aromatic heterocycle, reference can be made to the description and the preferred range of the heterocycle to constitute a heteroarylene group in the case where $Ar^{15}$ and $Ar^{16}$ mentioned below are each a substituted or unsubstituted heteroarylene group. Of the examples, the aromatic ring is preferably a benzene ring or a biphenyl ring, more preferably a biphenyl ring. The aromatic ring may have a substituent. Regarding the specific examples and the preferred range of the substituent with which the aromatic ring can be substituted, reference can be made to the specific examples and the preferred range of the substituent with which the arylene group in $Ar^{15}$ and $Ar^{16}$ mentioned below can be substituted. On the other hand, the dialkylamino group preferably bonds to the aromatic ring as a substituent thereon. The number of the dialkylamino group that the structural unit having a dialkylamino group and an aromatic ring contains can be one, or can be 2 or more, but is preferably 1 to 4, more preferably 2 or 4, even more preferably 2. Regarding the description, the preferred range and the specific examples of the alkyl group of the dialkylamino group, reference can be made to the description, the preferred range and the specific examples of the alkyl group in $R^{21}$ mentioned below. The alkyl group of the dialkylamino group can be substituted with a substituent. Regarding the description and the preferred range of the substituent, reference can be made to the description and the preferred range of the substituent with which the alkyl group in $R^{21}$ can be substituted.

Examples of the atomic group having a dialkylamino group and an aromatic ring include atomic groups having a structure represented by the following general formula (1).

General Formula (1)

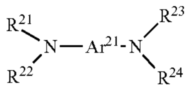

In the general formula (1), $Ar^{21}$ represents a substituted or unsubstituted arylene group, $R^{21}$ to $R^{24}$ each independently represent a substituted or unsubstituted alkyl group. At least one hydrogen atom of the substituted or unsubstituted arylene group that $Ar^{21}$ represents and the substituted or unsubstituted alkyl group that $R^{21}$ to $R^{24}$ represent is substituted with a units-linking group.

The explanation and the preferable scope of the aromatic ring constituting the arylene group and the specific examples of the arylene group in the case w % here $Ar^{15}$ and $Ar^{16}$ are each a substituted or unsubstituted arylene group below can be referred to for the explanation and a preferable scope of the aromatic ring constituting the arylene group of $Ar^{21}$ and for specific examples of the arylene group. $Ar^{21}$ is preferably a substituted or unsubstituted phenylene group or a substituted or unsubstituted biphenyldiyl group, more preferably a substituted or unsubstituted biphenyldiyl group. The specific examples and the preferable scope of the substituents which the arylene group and the like of $Ar^{15}$ and $Ar^{16}$ below may have can be referred to for specific examples and a preferable scope of the substituent which the arylene group here may have.

$R^{21}$ to $R^{24}$ each independently represent a substituted or unsubstituted alkyl group. $R^{21}$ to $R^{24}$ may be the same or different from each other. The alkyl group of $R^{21}$ to $R^{24}$ may be any of linear, branched and cyclic groups. The number of the carbon atoms is preferably 1 to 20, more preferably 1 to 10, further preferably 1 to 6. Examples include methyl group, ethyl group, n-propyl group, isopropyl group and the like. Examples of the substituent which the alkyl group may have include an aryl group having 6 to 40 carbon atoms, a heteroaryl group having 3 to 40 carbon atoms, an alkenyl group having 2 to 10 carbon atoms, an alkynyl group having 2 to 10 carbon atoms and the like. These substituents may further have a substituent.

The "diarylamine structure" of the atomic group having a diarylamine structure means both a diarylamine represented by the following general formula (2), and a heterocycle represented by the following general formula (3), namely a heterocycle formed of a diarylamine by linking the aryl groups therein with a linking group (in other words, an aromatic heterocycle having a structure of a nitrogen atom-containing heterocycle with two aromatic rings condensed thereto).

General Formula (2)

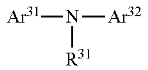

General Formula (3)

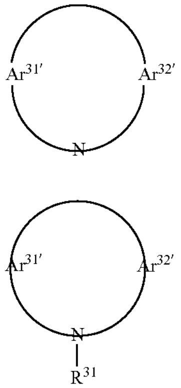

In the general formulae (2) and (3), $R^{31}$ represents a hydrogen atom or a bonding position. In the general formula (2), $Ar^{31}$ and $Ar^{32}$ each independently represent a substituted or unsubstituted aryl group, $Ar^{31}$ and $Ar^{32}$ can be the same as or different from each other. In the general formula (3), $Ar^{31'}$ and $Ar^{32'}$ each represent a substituted or unsubstituted aromatic ring each differing the aryl group that constitutes $Ar^{31}$ and $Ar^{32}$, respectively, in that the hydrogen atom of the group is replaced with a bonding position of a single bond. In the general formula (2), at least one hydrogen atom of the substituted or unsubstituted aryl group in $Ar^{31}$ and $Ar^{32}$, and the hydrogen atom of $R^{31}$ is substituted with a units-linking group, and in the general formula (3), at least one hydrogen atom of the substituted or unsubstituted aromatic ring in $Ar^{31'}$ and $Ar^{='}$, and the hydrogen atom of $R^{31}$ is substituted with a units-linking group.

Regarding the description, the preferred range and the specific examples of the aryl group in $Ar^{31}$ and $Ar^{32}$, reference can be made to the description, the preferred range and the specific examples of the aryl group of the substituted or unsubstituted aryl group for $Ar^{11}$ to $Ar^{14}$ mentioned below. Regarding the specific examples and the preferred range of the substituent with which the aryl group can be substituted, reference can be made to the specific examples and the preferred range of the substituent with which $Ar^{11}$ to $Ar^{14}$ mentioned below can be substituted. Preferred examples of the diarylamine structure include a substituted or unsubstituted diphenylamino group, and a substituted or unsubstituted carbazole ring.

The units-linking group that the structural unit of the first structural unit group is a polyvalent group having a structure derived form the polymerizable group of a raw monomer for the structural unit, and is preferably a divalent or a trivalent group. The divalent linking group links the first atomic group to one neighbor structural unit, and the trivalent linking group links the first atomic group to both neighbor structural units. Regarding the description and the preferred range of the polymerizable group, reference can be made to the corresponding description in the section of "Polymer Synthesis Method" given below. Examples of the units-linking group include a substituted or unsubstituted alkylene group, a substituted or unsubstituted methine group, a substituted or unsubstituted arylene group, a carbonyl group, an oxy group (ether group), a thio group (thioether group), and a linking group formed by bonding at least two groups selected from these, as combined. The carbon number of the alkylene group to constitute the "substituted or unsubstituted alkylene group" is preferably 1 to 20, more preferably 1 to 10, even more preferably 1 to 6. Regarding the description and the preferred range of the substituent with which the alkylene group and the methine group can be substituted, reference can be made to the description and the preferred range of the substituent with which the alkyl group in $R^{24}$ above can be substituted. Regarding the description, the preferred range and the specific examples of the arylene group to constitute the "substituted or unsubstituted arylene group", reference can be made to the description, the preferred range and the specific examples of the arylene group of the substituted or unsubstituted arylene group for $Ar^{15}$ and $Ar^{16}$ mentioned below. Regarding the specific examples and the preferred range of the substituent with which the arylene group can be substituted, reference can be made to the specific examples and the preferred range of the substituent with which the arylene group for $Ar^{15}$ and $Ar^{16}$ mentioned below can be substituted.

Preferred examples of the units-linking group include linking groups represented by the following general formula (4) or (5).

General Formula (4)

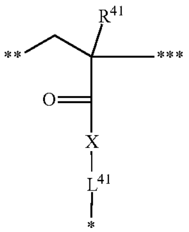

General Formula (5)

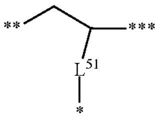

In the general formula (4), $R^{41}$ represents a hydrogen atom or a methyl group, X represents an oxygen atom or NH, $L^{41}$ represents a single bond or a linking group. In the general formula (5), $L^{51}$ represents a single bond or a linking group. The linking group for $L^{41}$ and $L^{51}$ includes an oxygen atom, a substituted or unsubstituted alkylene group, a substituted or unsubstituted arylene group, and a linking group formed of at least two of these linking to each other. Regarding the description of the substituted or unsubstituted alkylene group and the substituted or unsubstituted arylene group, reference may be made to the description relating to the substituted or unsubstituted alkylene group and the substituted or unsubstituted arylene group in the examples of the units-linking group mentioned above. In the general formulae (4) and (5), * indicates a bonding position to the atom constituting the first atomic group, and  and * each indicate a bonding position to the neighbor structural unit.

Preferred examples of the first atomic group are mentioned below. At least one hydrogen atom in the following structure is substituted with a units-linking group, and at least the other one hydrogen atom can be substituted with a substituent. Regarding the preferred range and the specific examples of the substituent, reference can be made to the specific examples and the preferred range of the substituent with which the aryl group in $Ar^{11}$ to $Ar^{14}$ below can be substituted. The first atomic group contained in the structural unit of the first structural unit group should not be limitatively interpreted by these examples. In the present description, $CH_3$ of a methyl group is omitted. Consequently, for example, the first specific example represents N,N-dimethylaniline.

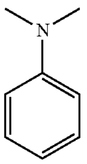

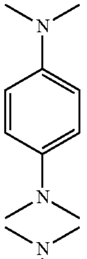

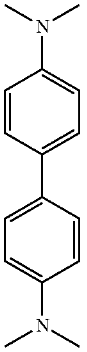

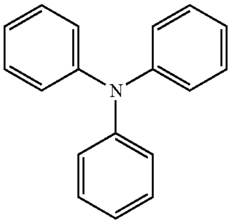

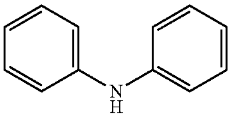

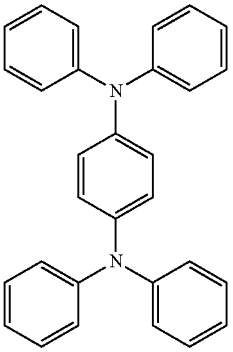

-continued
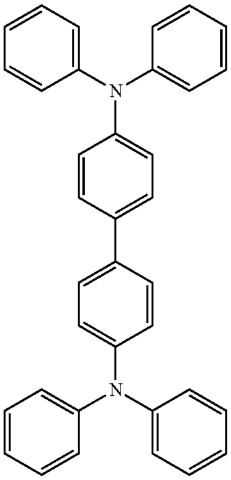
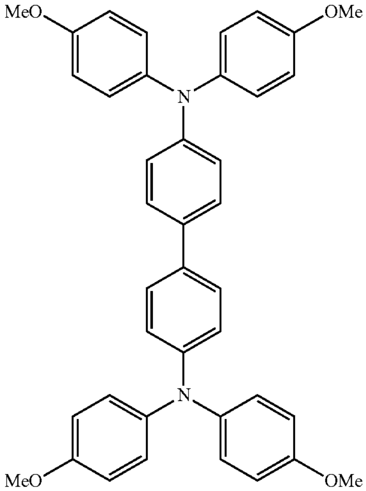
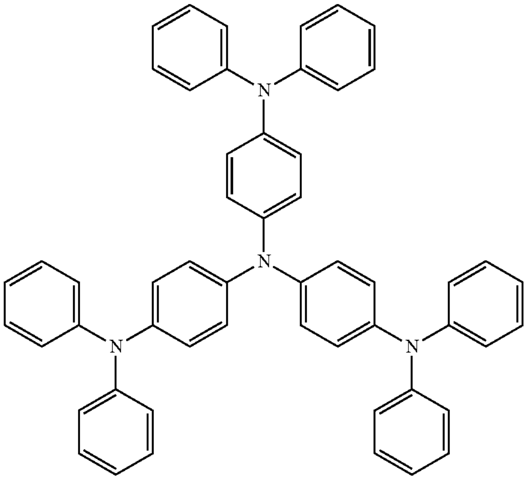
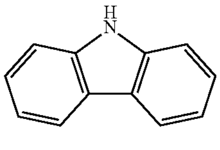
-continued
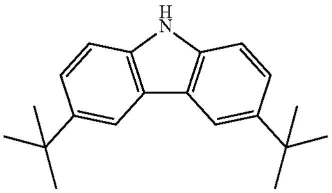
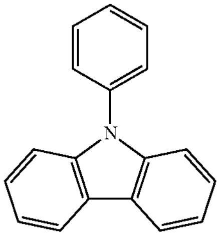
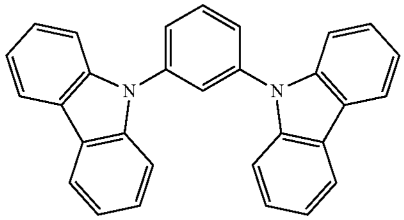
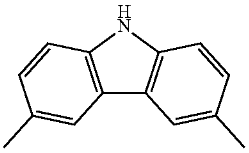
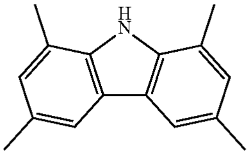
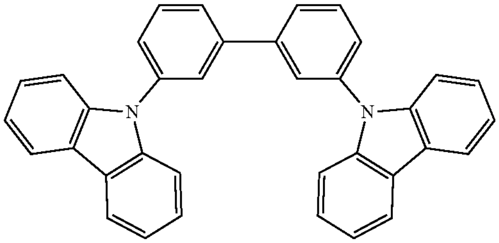
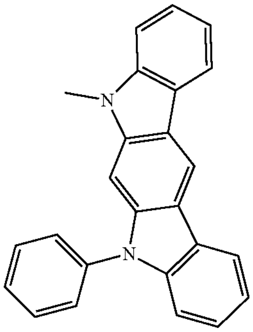

-continued
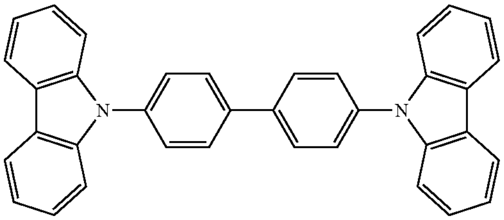
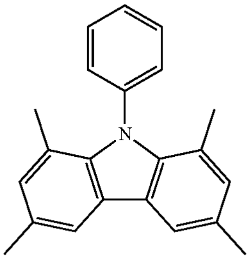
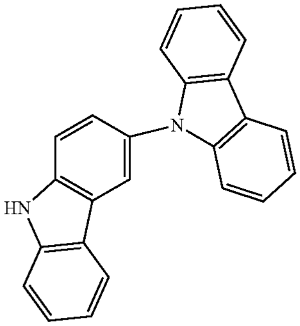
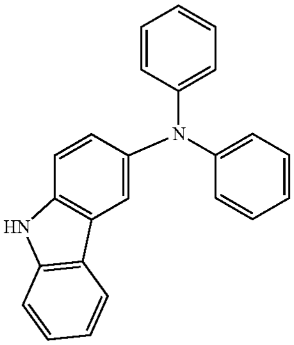
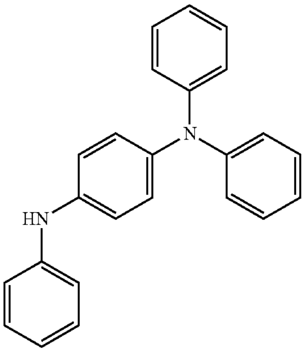
-continued
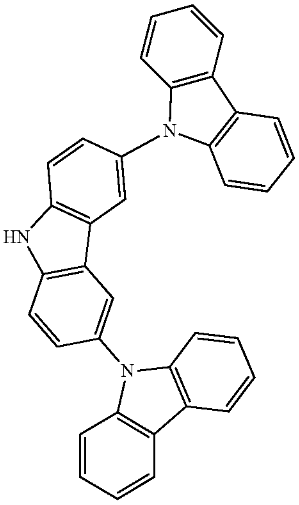
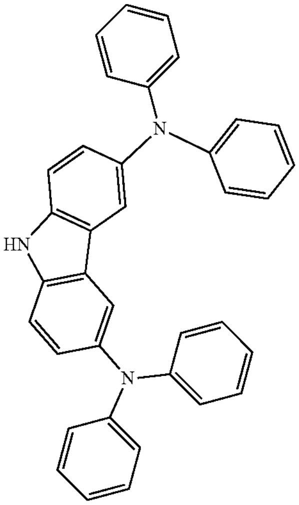
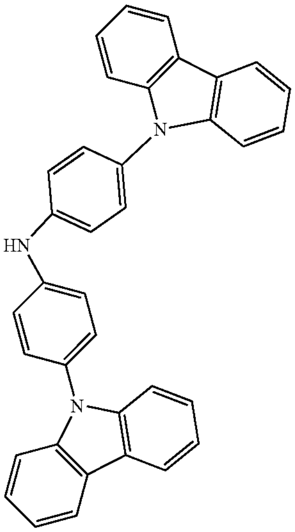

-continued
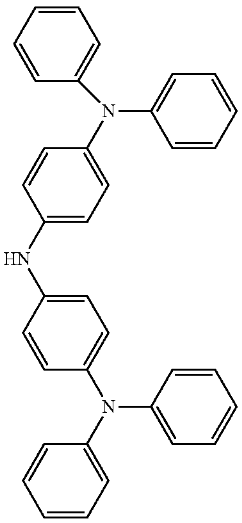
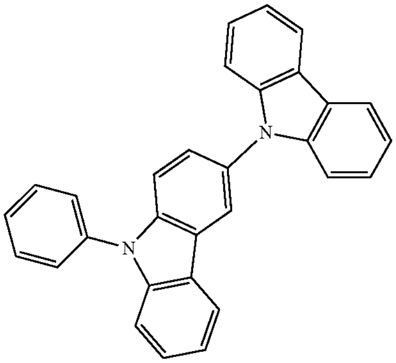
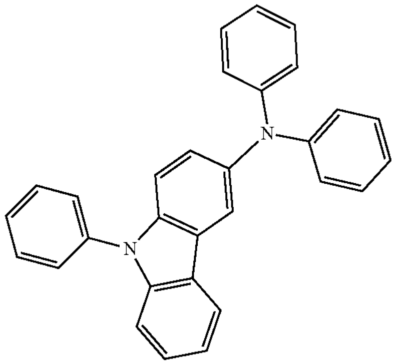
-continued
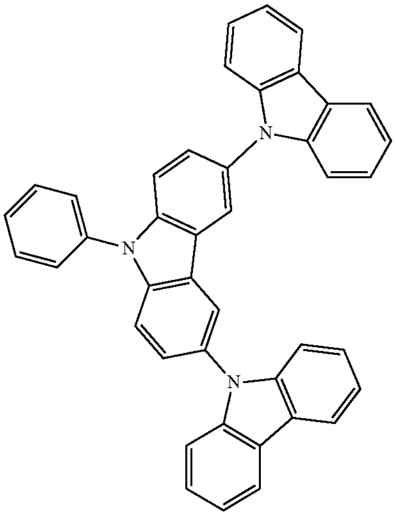
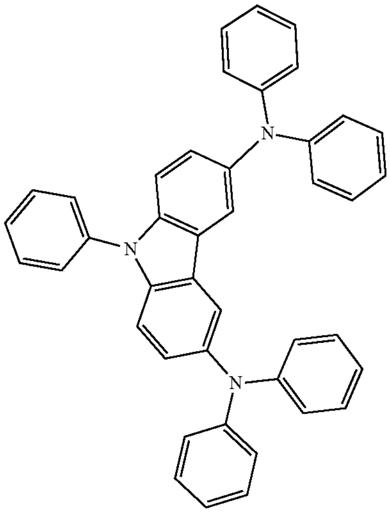
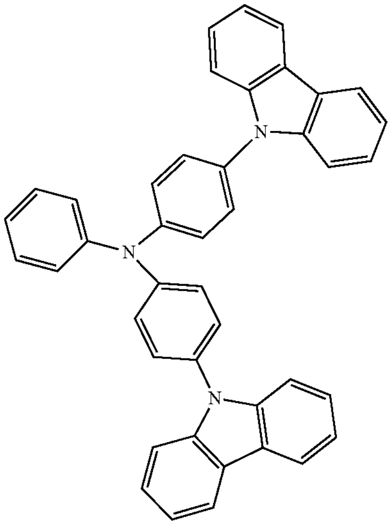

-continued
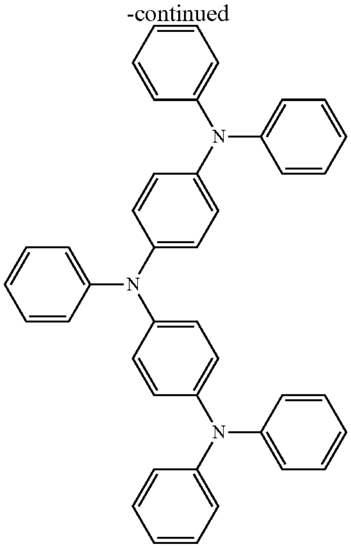
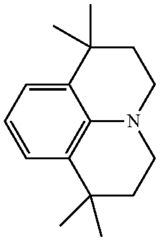
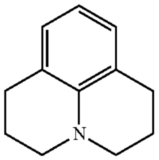
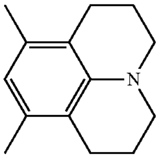
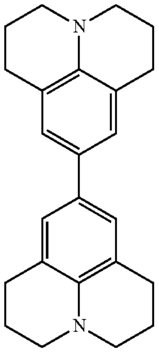
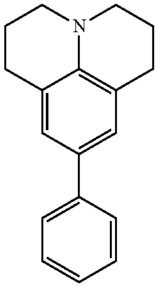
-continued
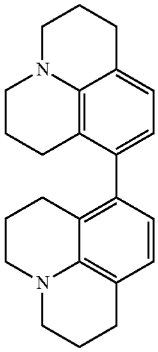
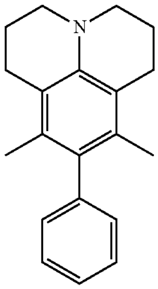
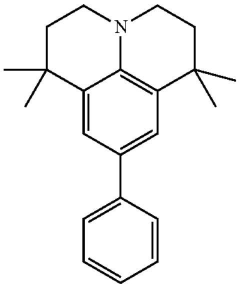
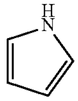
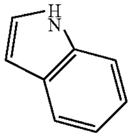
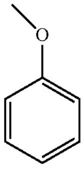
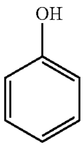
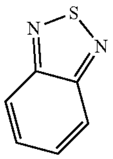

-continued
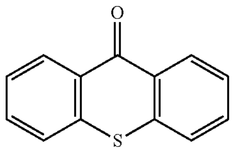
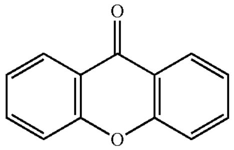
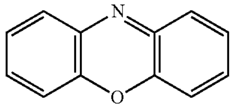
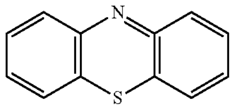
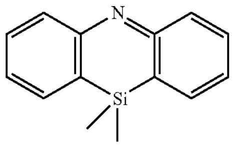
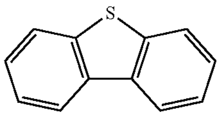
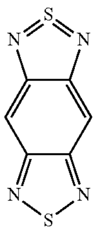
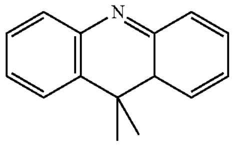
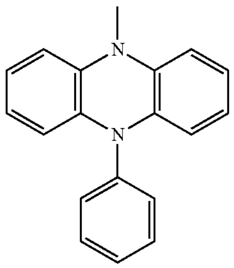
-continued
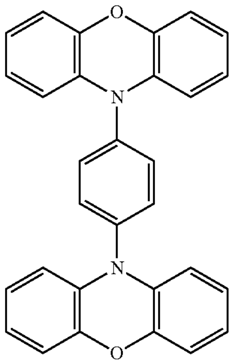
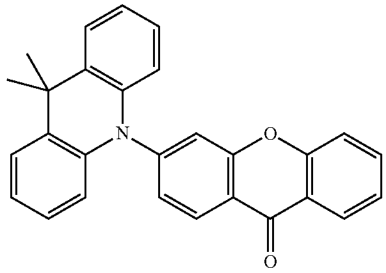
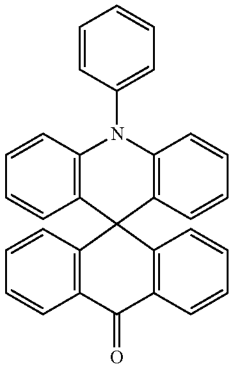
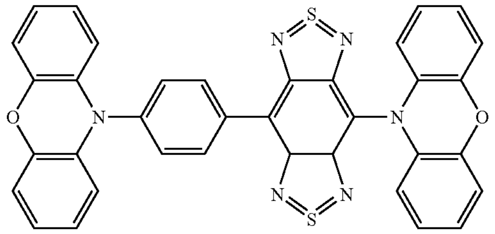
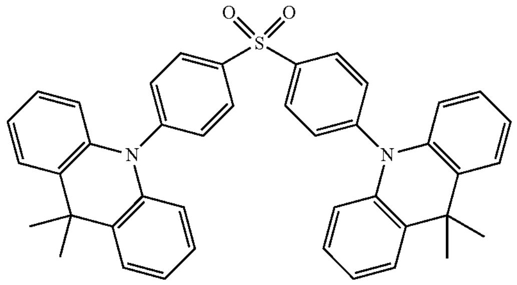

-continued

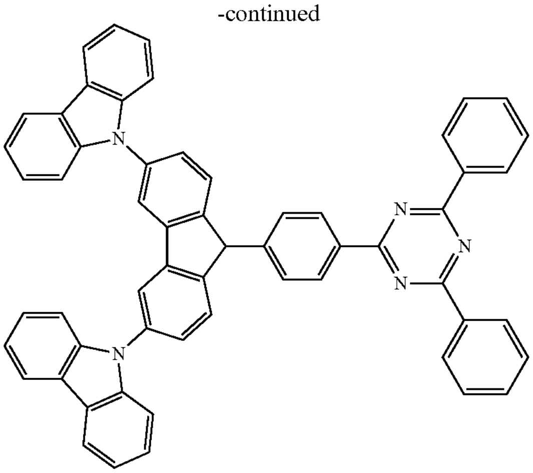

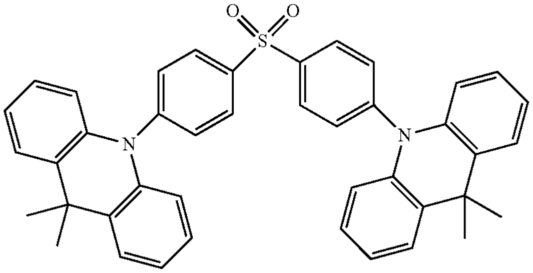

Specific examples of the structural unit containing the first atomic group are shown below. However, the structural unit of the first structural unit group should not be limitatively interpreted by these specific examples.

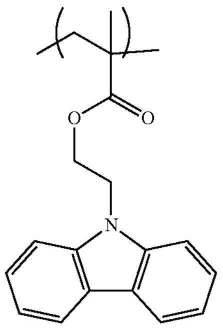

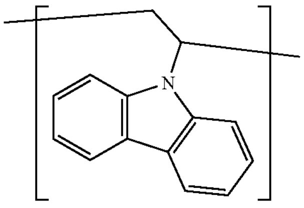

[Second Structural Unit Group]

The structural unit contained in the second structural unit group includes an atomic group having an atom having a high electronegativity or an electron-accepting group and a units-linking group that links the atomic group to the neighbor structural unit. In the following description, "an atomic group having an atom having a high electronegativity or an electron-accepting group" that the structural unit of the second structural unit group contains may be referred to as "second atomic group". Regarding the description and the preferred range of the units-linking group, reference can be made to the description and the preferred range of the units-linking group that the structural unit of the first structural unit group has, in which "first atomic group" can be replaced by "second atomic group".

The second atomic group is preferably an atomic group having an atom having a high electronegativity or an electron-accepting group and a conjugated system, more preferably an atomic group having an atom having a high electronegativity or an electron-accepting group and an aromatic ring. The second atomic group is also preferably an electron-accepting group containing a conjugated system. The electron-accepting group includes a diarylphosphinoyl group, a cyano group, a fluoroalkyl group (preferably a perfluoroalkyl group such as a trifluoromethyl group), a pentafluorosulfanyl group, a diarylboryl group, a carbonyl group, a sulfonyl group, an imide group, and a π-electron-deficient aromatic heterocycle-containing group. Here, the π-electron-deficient aromatic heterocycle-containing group includes a heteroaryl group containing nitrogen as a ring atom, and a group containing a pyrylium ring, a thiopyrylium ring or a pyridinium ring, and is preferably a 6-membered, π-electron-deficient aromatic heterocycle-containing group. The heteroaryl group containing nitrogen as a ring atom includes a pyridyl group, a pyrimidyl group, a pyridazyl group, a pyrazyl group, a triazinyl group, and a heteroaryl group having a structure where an aromatic ring is condensed with the heterocycle that constitutes the heteroaryl group.

The second atomic group also includes an atomic group containing at least one phosphine oxide structure $R_3P(=O)$ (wherein R represents a substituent, and the three R's may be the same or different from each other), and a preferable example thereof is an atomic group containing at least one phosphine oxide structure $R_3P(=O)$ and at least one hetero atom in addition thereto. The hetero atom includes N, O, S, and P. Only one kind thereof may be contained, or two or more kinds thereof may be contained. The number of the phosphine oxide structures that the structural unit containing at least one phosphine oxide structure contains is preferably two or more, and in that case, the plural phosphine oxide structures may be the same or different from each other. Also preferably, the plural phosphine oxide structures are such that at least one substituent R links to the substituent R of the other phosphine oxide structure via a hetero atom, and more preferably, at least one substituent R links to the substituent R of the other phosphine oxide structure via a hetero atom and the atoms differing from the atom bonding to the hetero atom of the linking substituent R link to each other via a single bond.

The substituents R's of the phosphine oxide structures are each preferably a substituted or unsubstituted aryl group or a substituted or unsubstituted heteroaryl group. The explanation and the preferable scope of the aromatic ring constituting the aryl group and the specific examples of the aryl group in the case where $Ar^{11}$ and the like are each a substituted or unsubstituted aryl group below can be referred to for the explanation and a preferable scope of the aromatic ring constituting the aryl group here and for specific examples of the aryl group. The explanation and the preferable scope of the heterocycle constituting the heteroaryl group and the specific examples of the heteroaryl group in the case where $Ar^{11}$ and the like are each a substituted or unsubstituted heteroaryl group below can be referred to for the explanation and a preferable scope of the heterocycle constituting the heteroaryl group here and for specific examples of the heteroaryl group. The specific examples and the preferable scope of the substituents which the aryl group and the heteroaryl group of $Ar^{11}$ and the like may have can be referred to for specific examples and a preferable scope of the substituents which the aryl group and the heteroaryl group here may have.

Examples of the second atomic group containing at least one phosphine oxide structure include atomic groups having a structure represented by the following general formula (6).

General Formula (6)

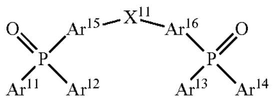

In the general formula (6), $Ar^{11}$ to $Ar^{14}$ each independently represent a substituted or unsubstituted aryl group or a substituted or unsubstituted heteroaryl group and are preferably a substituted or unsubstituted aryl group. $Ar^{11}$ to $Ar^{14}$ may be the same or different from each other. $Ar^{15}$ and $Ar^{16}$ each independently represent a substituted or unsubstituted arylene group or a substituted or unsubstituted heteroarylene group, and $Ar^{15}$ and $Ar^{16}$ may be linked to each other through a single bond and form a condensed ring structure. $Ar^{15}$ and $Ar^{16}$ may be the same or different from each other. $Ar^{15}$ and $Ar^{16}$ are preferably substituted or unsubstituted arylene groups, and it is more preferable that the arylene groups are linked to each other through a single bond and form a condensed ring structure. At least one hydrogen atom of the substituted or unsubstituted aryl group or the substituted or unsubstituted heteroaryl group that $Ar^{11}$ to $Ar^{14}$ represent, and the substituted or unsubstituted arylene group or the substituted or unsubstituted heteroarylene group that $Ar^{15}$ and $Ar^{16}$ represent is substituted with a linking group that bonds to the neighbor structural unit.

The aromatic ring constituting the aryl group in the case where $Ar^{11}$ to $Ar^{14}$ are each a substituted or unsubstituted aryl group and the aromatic ring constituting the arylene group in the case where $Ar^{15}$ and $Ar^{16}$ are each a substituted or unsubstituted arylene group may be each a monocyclic ring, a condensed ring formed by condensation of two or more aromatic rings or linked rings formed by two or more linked aromatic rings. When two or more aromatic rings are linked, the rings may be linked linearly or linked in a branch structure. The number of the carbon atoms of the aromatic ring constituting the aryl group or the arylene group is preferably 6 to 40, more preferably 6 to 22, further preferably 6 to 18, still further preferably 6 to 14, particularly preferably 6 to 10. Specific examples of the aryl group include phenyl group, naphthalenyl group and biphenyl group. Specific examples of the arylene group include phenylene group, naphthalenediyl group and biphenyldiyl group. Of these examples, a substituted or unsubstituted phenyl group is particularly preferable as $Ar^{11}$ to $Ar^{14}$. A substituted or unsubstituted phenylene group is particularly preferable as $Ar^{15}$ and $Ar^{16}$, and it is particularly preferable that the phenylene groups are linked to each other through a single bond and form a tricyclic structure (a tricyclic structure of a benzene ring, a five-membered ring including $X^{11}$ and a benzene ring).

The heterocycle constituting the heteroaryl group in the case where $Ar^{11}$ to $Ar^{14}$ are each a substituted or unsubstituted heteroaryl group and the heterocycle constituting the heteroarylene group in the case where $Ar^{15}$ and $Ar^{16}$ are each a substituted or unsubstituted heteroarylene group may be each a monocyclic ring, a condensed ring formed by one heterocycle or more condensed with an aromatic ring or with a heterocycle or linked rings formed by one heterocycle or more linked to an aromatic ring or to a heterocycle. The number of the carbon atoms of the heterocycle constituting the heteroaryl group is preferably 3 to 40, more preferably 5 to 22, further preferably 5 to 18, still further preferably 5 to 14, particularly preferably 5 to 10. The hetero atom constituting the heterocycle is preferably nitrogen atom. Specific examples of the heterocycle include pyridine ring, pyridazine ring, pyrimidine ring, triazole ring and benzotriazole ring.

Examples of the substituents which the aryl group and the heteroaryl group of $Ar^{11}$ to $Ar^{14}$ may have and the substituents which the arylene group and the heteroarylene group of $Ar^{15}$ and $Ar^{16}$ may have include hydroxy group, a halogen atom, an alkyl group having 1 to 20 carbon atoms, an alkoxy group having 1 to 20 carbon atoms, an alkylthio group having 1 to 20 carbon atoms, an alkyl-substituted amino group having 1 to 20 carbon atoms, an aryl-substituted amino group having 1 to 20 carbon atoms, an aryl group having 6 to 40 carbon atoms, a heteroaryl group having 3 to 40 carbon atoms, an alkenyl group having 2 to 10 carbon atoms, an alkynyl group having 2 to 10 carbon atoms, an alkylamide group having 2 to 20 carbon atoms, an arylamide group having 7 to 21 carbon atoms, a trialkylsilyl group having 3 to 20 carbon atoms and the like. Of these specific examples, those which can further have a substituent may be substituted. More preferable substituents are an alkyl group having 1 to 20 carbon atoms, an alkoxy group having 1 to 20 carbon atoms, an alkylthio group having 1 to 20 carbon atoms, an alkyl-substituted amino group having 1 to 20 carbon atoms, an aryl-substituted amino group having 1 to 20 carbon atoms, an aryl group having 6 to 40 carbon atoms and a heteroaryl group having 3 to 40 carbon atoms.

$X^{11}$ represents $NR^{11}$, O or S, and $R^{11}$ represents a hydrogen atom or a substituent. Examples of the substituent which $R^{11}$ may represent include an alkyl group having 1 to 20 carbon atoms, an aryl group having 6 to 40 carbon atoms, a heteroaryl group having 3 to 40 carbon atoms, an alkenyl group having 2 to 10 carbon atoms, an alkynyl group having 2 to 10 carbon atoms and the like. These substituents may further have a substituent. $R^{11}$ is preferably a hydrogen atom or a substituted or unsubstituted aryl group, more preferably a substituted or unsubstituted aryl group, further preferably a substituted or unsubstituted phenyl group.

Preferred examples of the second atomic group are shown below. At least one hydrogen atom of the following structure is substituted with a units-linking group, and at least one other hydrogen atom can be substituted with a substituent. Regarding the preferred range and the specific examples of the substituent, reference can be made to the specific examples and the preferred range of the substituent with which the aryl group in $Ar^{11}$ to $Ar^{14}$ mentioned below can be substituted. The second atomic group contained in the structural unit of the second structural unit group should not be limitatively interpreted by these examples.

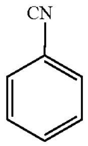

-continued
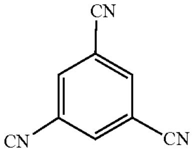
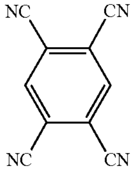
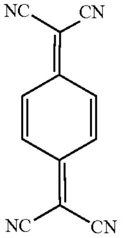
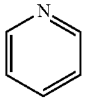
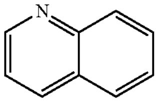
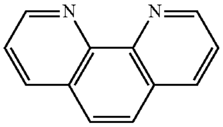
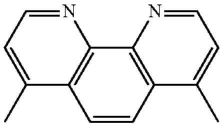
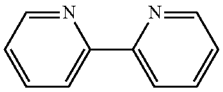
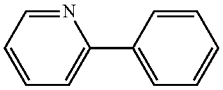
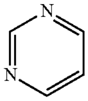
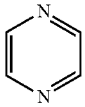
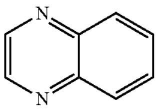
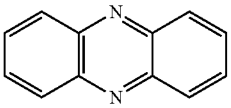
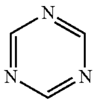
-continued
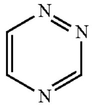
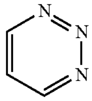
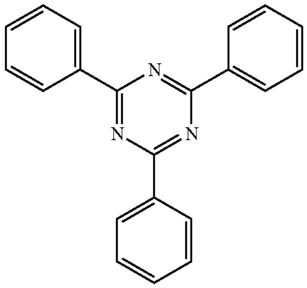
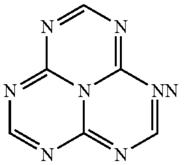
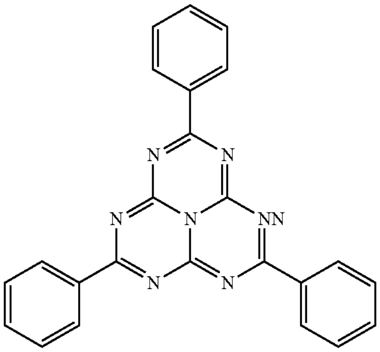
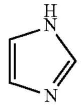
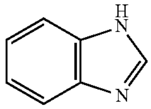
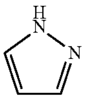
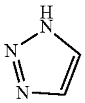
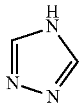

-continued
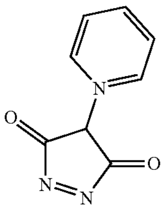
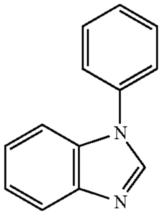
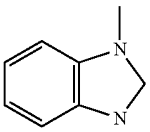
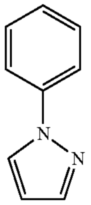
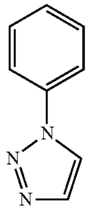
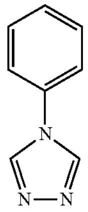
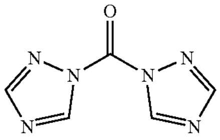
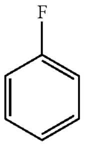
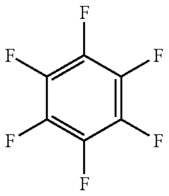
-continued
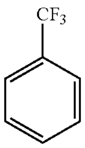
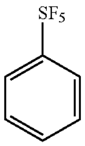
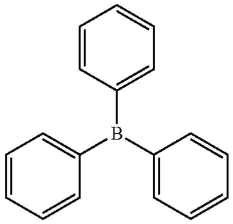
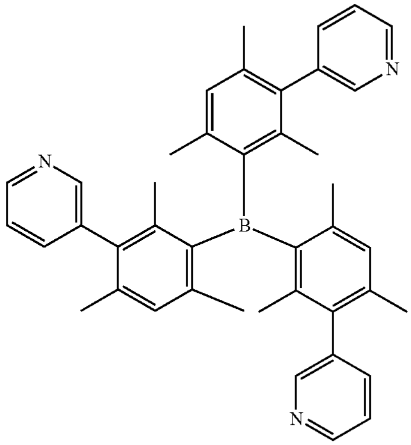
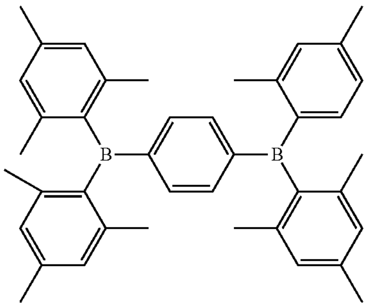
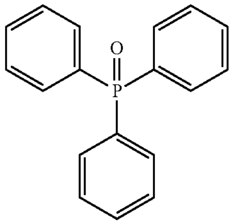

-continued
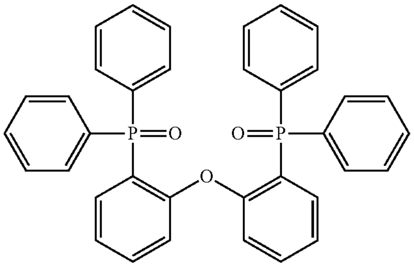
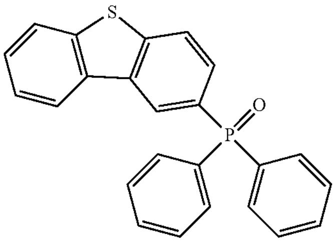
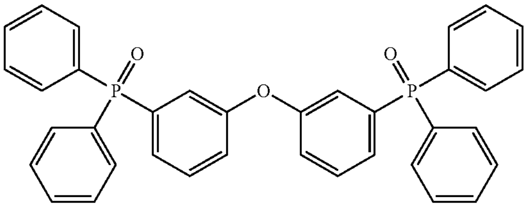
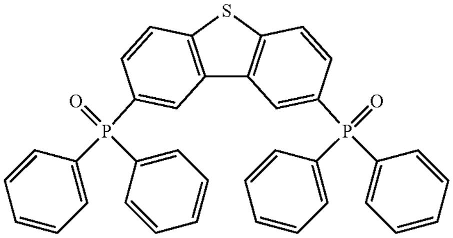
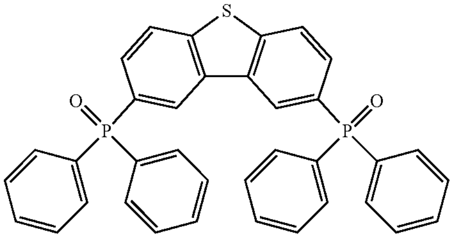
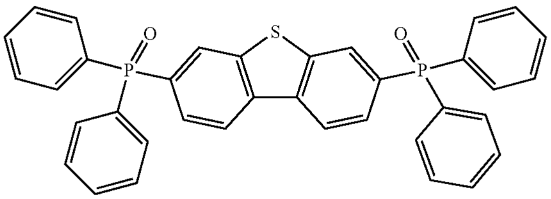
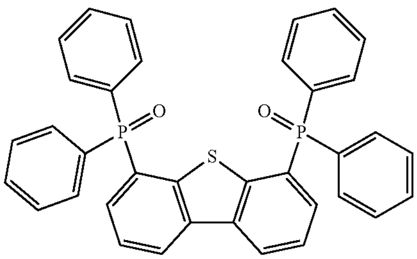
-continued
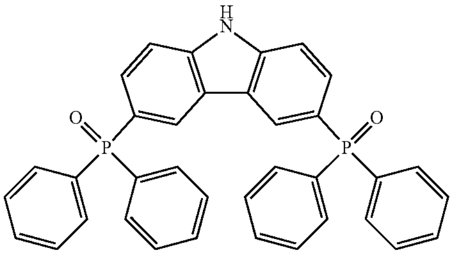
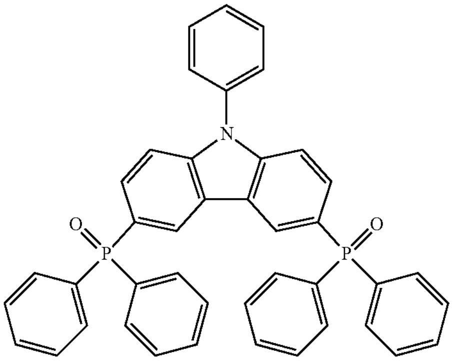
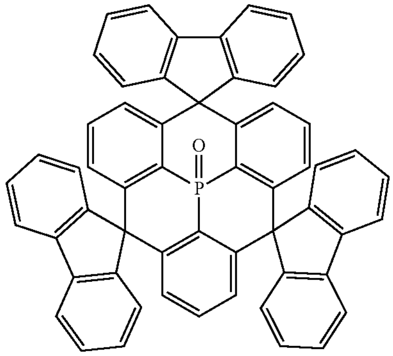
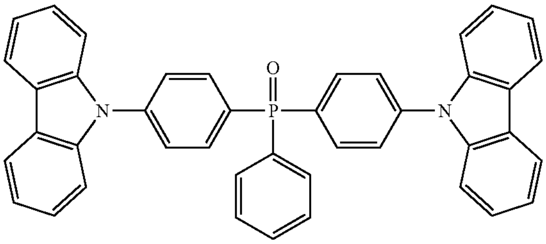
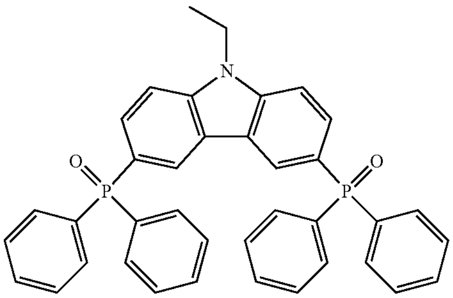

-continued
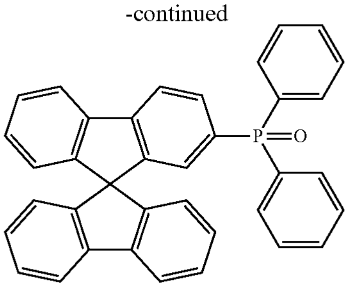
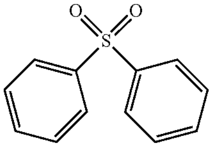
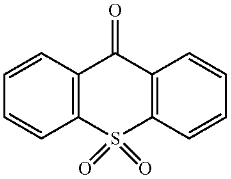
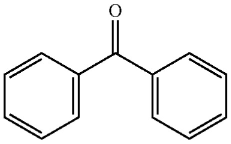
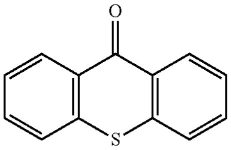
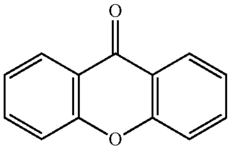
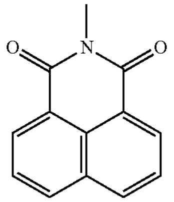
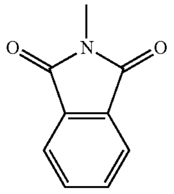
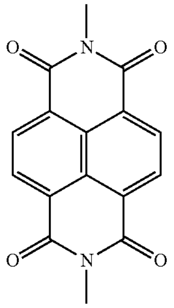
-continued
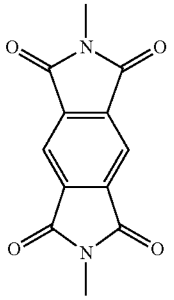
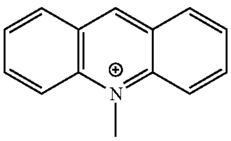
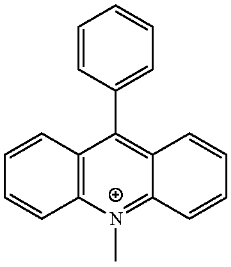
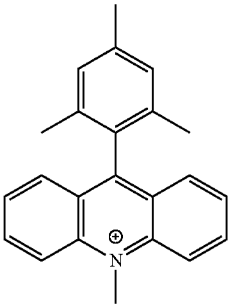
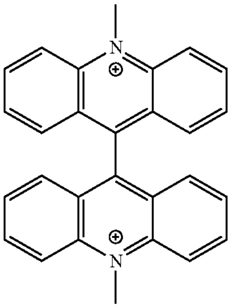
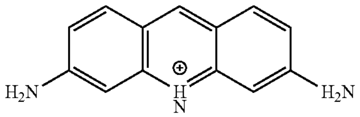
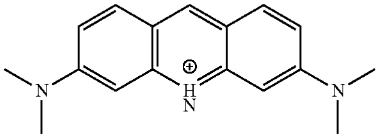
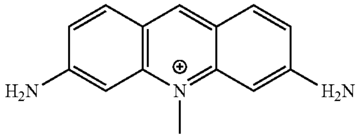

-continued
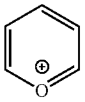
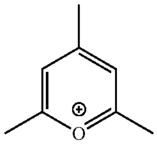
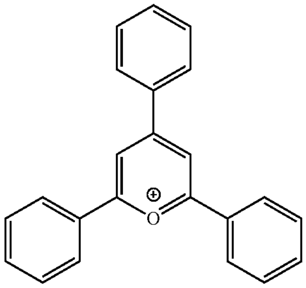
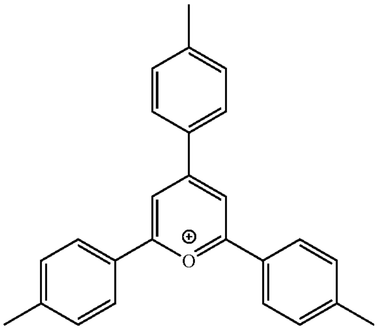
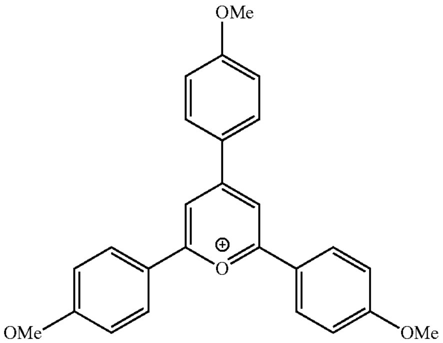
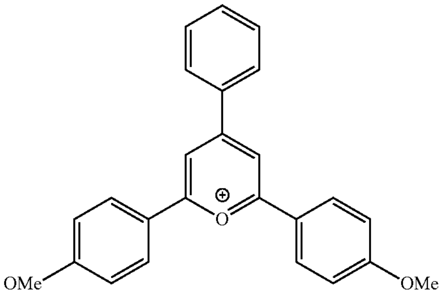
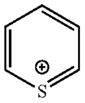
-continued
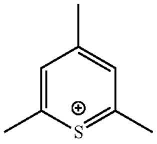
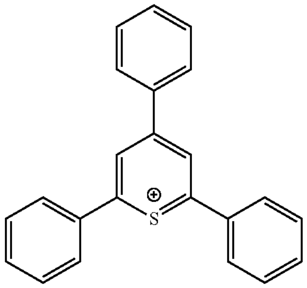
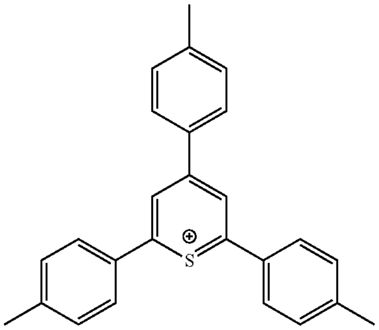
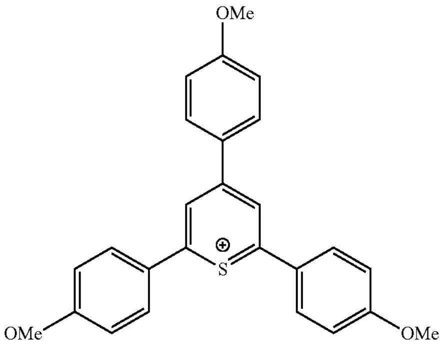
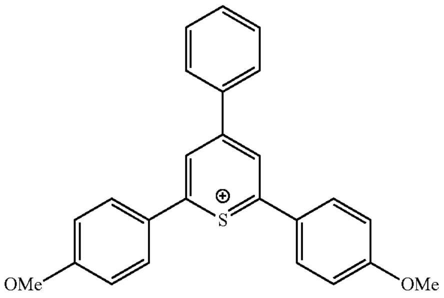
Specific examples of the structural unit that contains the second atomic group are shown below. The structural unit of the second structural unit group should not be limitatively interpreted by these specific examples.

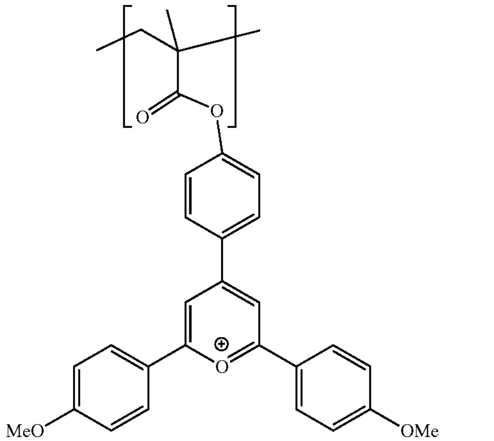

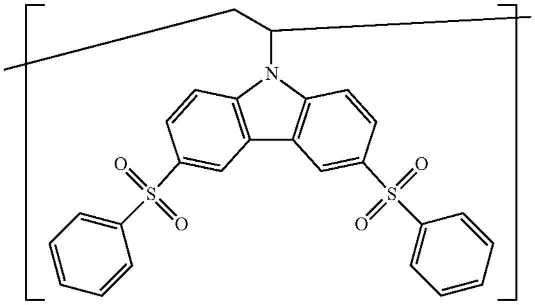

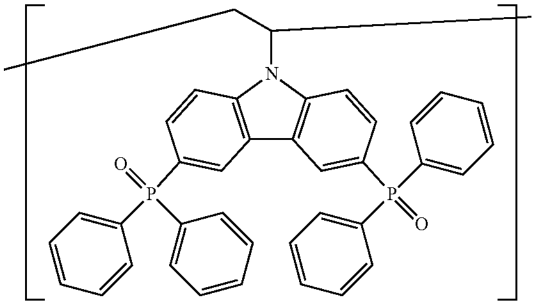

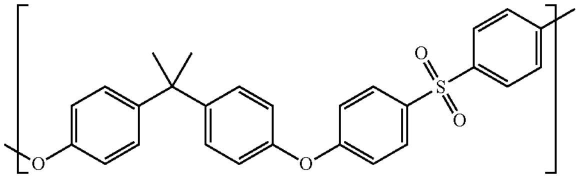

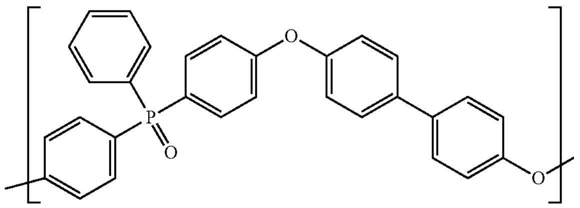

(Proportion of Electron Donor Structural Unit and Electron Acceptor Structural Unit)

Of the polymer for use in the present invention, the first polymer contains, relative to the total molar amount of an electron donor structural unit and an electron acceptor structural unit therein, 70 mol % or more of an electron donor structural unit and less than 30 mol % of an electron acceptor structural unit, and the second polymer contains, relative to the total molar amount of an electron donor structural unit and an electron acceptor structural unit therein, 70 mol % or more of an electron acceptor structural unit and less than 30 mol % of an electron donor structural unit.

In the first polymer, the proportion of the electron acceptor structural unit is preferably less than 20 mol % relative to the total molar amount of the electron donor structural unit and the electron acceptor structural unit therein, more preferably less than 10 mol %, even more preferably less than 5 mol %. In the first polymer, the proportion of the electron acceptor structural unit is preferably more than 0.000001 mol % relative to the total molar amount of the electron donor structural unit and the electron acceptor structural unit therein, more preferably more than 0.01 mol %, even more preferably 0.05 mol %.

In the second polymer, the proportion of the electron donor structural unit is preferably less than 20 mol % relative to the total molar amount of the electron donor structural unit and the electron acceptor structural unit therein, more preferably less than 10 mol %, even more preferably less than 5 mol %. In the second polymer, the proportion of the electron donor structural unit is preferably more than 0.000001 mol % relative to the total molar amount of the electron donor structural unit and the electron acceptor structural unit therein, more preferably more than 0.01 mol %, even more preferably 0.05 mol %.

(Other Structural Unit)

The structural units that the polymer for use in the present invention contains may be an electron donor structural unit and an electron acceptor structural unit alone, but may contain any other structural unit. The other structural unit includes a neutral structural unit (structural unit that is neither an electron donor structural unit nor an electron acceptor structural unit) formed of a raw monomer such as ethylene, propylene, butylene and styrene.

In the case where the polymer contains the other structural unit, the total molar amount of the donor structural unit and the acceptor structural unit is preferably 1 mol % or more relative to the total molar amount of the structural units constituting the polymer, more preferably 10 mol % or more, and can be selected from a range of, for example, 30 to 60 mol %, or from a range of 60 to 90 mol %, or from a range of 90 to 99.99 mol %, or can be 100 mol %.

The other structural unit that can be introduced into the first polymer includes a hole trapping structural unit mentioned below, and the other structural unit that can be introduced into the second polymer includes an electron trapping structural unit mentioned below.

(Hole Trapping Structural Unit)

The “hole trapping structural unit” in this description means a structural unit which can receive the hole having moved from an electron donor structural unit to accumulate it therein and, when given energy, can release the hole to hand off it to an electron donor structural unit.

When the first polymer contains such a hole trapping structural unit, a hole moves to the hole trapping structural unit from the electron donor structural unit that is m an oxidized state formed through charge separation, and is stably accumulated in the hole trapping structural unit. The hole accumulated in the hole trapping structural unit is, even after irradiation with excitation light is stopped, released owing to the energy of heat or light stimulation and returns back to the electron donor structural unit. The hole is recombined with the electron in the electron acceptor structural unit to contribute toward light emission, therefore prolonging persistent luminescence further more.

The hole trapping structural unit preferably has a HOMO level close to the HOMO level of the electron donor structural unit. Specifically, it is preferable that the HOMO level of the hole trapping structural unit is higher by 0.01 eV or more than the HOMO level of the electron donor structural unit, more preferably higher by 0.1 eV or more, even more preferably higher by 0.2 eV or more, further more preferably higher by 0.3 eV or more. With that, the difference between the HOMO level of the hole trapping structural unit and the HOMO level of the electron donor structural unit is preferably 0.9 eV or less. Preferably, the LUMO level of the hole trapping structural unit is higher by 0.01 eV or more than the LUMO level of the electron donor structural unit, and can be, for example, higher by 0.1 eV or more. Regarding one embodiment of the hole trapping structural unit, the LUMO level thereof is −0.5 eV to −2.5 eV, for example, −1.0 eV to −1.7 eV, and the HOMO level thereof is −3.5 eV to −6.5 eV, for example, −4.0 eV to −5.0 eV.

Here, the HOMO level and the LUMO level of the hole trapping structural unit is a value measured with a compound corresponding to the hole trapping structural unit. The "compound corresponding to the hole trapping structural unit" is a compound obtained by replacing the units-linking group of the hole trapping structural unit with a hydrogen atom.

In the case where the first polymer contains the hole trapping structural unit, the proportion of the hole trapping structural unit is preferably 10 mol % or less relative to the total molar amount of the electron donor structural unit, the electron acceptor structural unit and the hole trapping structural unit, more preferably 5 mol % or less, even more preferably 2 mol % or less. The proportion of the hole trapping structural unit is preferably 0.01 mol % or more relative to the total molar amount of the electron donor structural unit, the electron acceptor structural unit and the hole trapping structural unit, more preferably 0.1 mol % or more.

(Electron Trapping Structural Unit)

The "electron trapping structural unit" in this description means a structural unit which can receive the electron having moved from an electron acceptor structural unit to accumulate it in the structural unit, and, when given energy, can hand off the electron to the electron acceptor structural unit.

When the second polymer contains such an electron trapping structural unit, an electron moves to the electron trapping structural unit from the electron acceptor structural unit that is in a reduced state formed through charge separation, and is stably accumulated in the electron trapping structural unit. The electron accumulated in the electron trapping structural unit is, even after irradiation with excitation light is stopped, released owing to the energy of heat or light stimulation and returns back to the electron acceptor structural unit. The electron is recombined with the hole in the electron donor structural unit to contribute toward light emission, therefore prolonging persistent luminescence further more.

The electron trapping structural unit preferably has a LUMO level close to the LUMO level of the electron acceptor structural unit. Specifically, it is preferable that the LUMO level of the electron trapping structural unit is lower by 0.01 eV or more than the LUMO level of the electron acceptor structural unit, more preferably lower by 0.1 eV or more, even more preferably lower by 0.2 eV or more, further more preferably lower by 0.3 eV or more. With that, the difference between the LUMO level of the electron trapping structural unit and the LUMO level of the electron acceptor structural unit is preferably 0.9 eV or less. Preferably, the HOMO level of the electron trapping structural unit is lower by 0.01 eV or more than the HOMO level of the electron donor structural unit, and can be, for example, lower by 0.1 eV or more. Regarding one embodiment of the electron trapping structural unit, the LUMO level thereof is −1.0 eV to −3.0 eV, for example, −1.5 eV to −2.2 eV, and the HOMO level thereof is −4.0 eV to −7.0 eV, for example, −4.5 eV to −5.5 eV.

Here, the HOMO level and the LUMO level of the electron trapping structural unit is a value measured with a compound corresponding to the electron trapping structural unit. The "compound corresponding to the electron trapping structural unit" is a compound obtained by replacing the units-linking group of the electron trapping structural unit with a hydrogen atom.

In the case where the second polymer contains the electron trapping structural unit, the proportion of the electron trapping structural unit is preferably 10 mol % or less relative to the total molar amount of the electron donor structural unit, the electron acceptor structural unit and the electron trapping structural unit, more preferably 5 mol % or less, even more preferably 2 mol % or less. The proportion of the electron trapping structural unit is preferably 0.01 mol % or more relative to the total molar amount of the electron donor structural unit, the electron acceptor structural unit and the electron trapping structural unit, more preferably 0.1 mol % or more.

(Polymer Configuration)

The alignment sequence of the structural units of the polymer for use in the present invention is not specifically limited. The polymer for use in the present invention can be a polymer that contains an electron donor structural unit and an electron acceptor structural unit in the main chain, or can be a polymer with an electron donor structural unit and an electron acceptor structural unit bonding to the main chain as pendant groups. In the latter embodiment, the polymer chain to constitute the main chain may contain or may not contain an electron donor structural unit and an electron acceptor structural unit. The polymer for use in the present invention may be a random copolymer produced by randomly polymerizing a raw monomer for an electron donor structural unit and a raw monomer for an electron acceptor structural unit, or may be a block copolymer having a block of a repetition of an electron donor structural unit and a block of a repetition of an electron acceptor structural unit, but is preferably a random copolymer.

Specific examples of the polymer for use in the long-persistent luminescence emitter of the present invention are shown below. However, the polymer for use in the long-persistent luminescence emitter of the present invention should not be limitatively interpreted by these specific examples. In the following formulae, the structural unit parenthesized by m corresponds to an electron acceptor structural unit, and the structural unit parenthesized by n corresponds to an electron donor structural unit. In the first polymer, m is an integer of 1 or more, and n is an integer of 3 or more. In the second polymer, m is an integer of 3 or more, and n is an integer of 1 or more. A cation-state electron acceptor structural unit may form a salt with a monovalent anion.

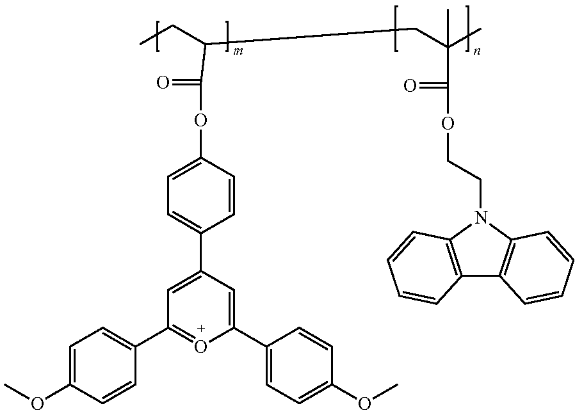

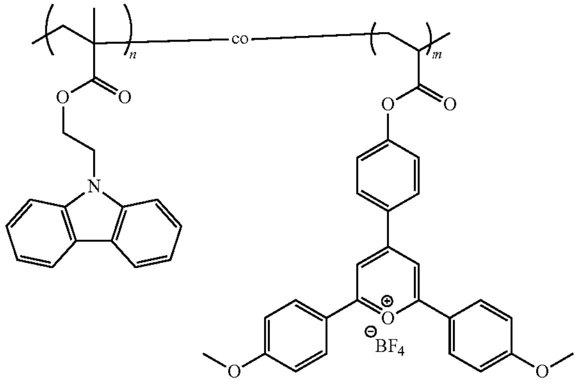

(Average Molecular Weight and Physical Properties of Polymer)

The average molecular weight of the polymer for use in the present invention is not specifically limited in relation to expression of long-persistent luminescence characteristics. For example, the average molecular weight can be selected from a range of 3,000 or more, or can be selected from a range of 5,000 or more, or can also be selected from a range of less than 500,000, or can be selected from a range of less than 100,000, or can be selected from a range of less than 10,000.

The glass transition temperature Tg of the polymer is preferably 20° C. or higher, more preferably 50° C. or higher, even more preferably 100° C. or higher. The thermal decomposition temperature of the polymer is preferably 50° C. or higher, more preferably 100° C. or higher, even more preferably 200° C. or higher.

[Composition, and Other Component of Long-Persistent Luminescence Emitter]

The long-persistent luminescence emitter of the present invention can realize persistent luminescence with one kind alone of the first polymer or with one kind alone of the second polymer, but a long-persistent luminescence emitter containing two or more kinds of the first polymer, or two or more kinds of the second polymer falls within the scope of the present invention. The long-persistent luminescence emitter may be composed of a polymer alone containing an electron donor structural unit and an electron acceptor structural unit in a predetermined ratio, but may contain any other component added thereto. The other component includes a hole trapping molecule and an electron trapping molecule. The hole trapping molecule is a component used in combination with the first polymer, and corresponds to a compound obtained by substituting the units-linking group of the hole trapping structural unit mentioned above with a hydrogen atom. Regarding the description of the hole trapping molecule, reference can be made to the description in the section of (Hole Trapping Structural Unit) in the above, in which "hole trapping structural unit" can be replaced by "hole trapping molecule". The electron trapping molecule is a component used in combination with the second polymer, and corresponds to a compound obtained by substituting the units-linking group of the electron trapping structural unit mentioned above with a hydrogen atom. Regarding the description of the electron trapping molecule, reference can be made to the description in the section of (Electron Trapping Structural Unit) in the above, in which "electron trapping structural unit" can be replaced by "electron trapping molecule".

The other component of the long-persistent luminescence emitter includes a light-emitting material. By adding a light-emitting material thereto, the emission wavelength of the long-persistent luminescence emitter can be controlled.

The light-emitting material may be any of a fluorescent material, a phosphorescent material or a delayed fluorescent material, and may be selected from any known ones in accordance with the intended emission color. Here, "fluorescent material" is a light-emitting material whose emission intensity of fluorescence is higher than the emission intensity of phosphorescence thereof at room temperature; "phosphorescent material" is a light-emitting material whose emission intensity of phosphorescence is higher than the emission intensity of fluorescence thereof at room temperature; and "delayed fluorescent material" is a light-emitting material that emits both fluorescence having a short emission lifetime and fluorescence having a long emission lifetime (delayed fluorescence) at room temperature. General fluorescence (fluorescence other than delayed fluorescence) has an emission lifetime on an ns order, and phosphorescence generally has an emission lifetime on an ms order, and accordingly, fluorescence and phosphorescence can be differentiated from each other in point of the emission lifetime thereof. A light-emitting organic compound other than organic metal complexes is a general fluorescent material or a delayed fluorescent material.

[Polymer Synthesis Method]

The polymer for use in the long-persistent luminescence emitter of the present invention can be synthesized by polymerizing a raw monomer for the electron donor structural unit and a raw monomer for the electron acceptor structural unit in a known polymerization method. The polymer for use in the present invention can be synthesized, for example, by (1) polymerization reaction of a monomer composition containing a raw monomer for the electron donor structural unit and a raw monomer for the electron acceptor structural unit, or by (2) chemically bonding a first polymer chain synthesized by polymerization reaction of a raw monomer for the electron donor structural unit, and a second polymer chain synthesized by polymerization reaction of a raw monomer for the electron acceptor structural unit, or by (3) synthesizing a first polymer chain, and then polymerizing a raw monomer for the electron acceptor structural unit extending from the end of the first polymer chain, or by (4) synthesizing a second polymer chain, and then polymerizing a raw material for the electron donor structural unit extending from the end of the second polymer chain. Regarding the details of the polymerization reaction, reference can be made to Synthesis Examples given hereinunder.

For the raw monomers for the electron donor structural unit and the electron acceptor structural unit, usable are compounds corresponding thereto and having a polymerizable group in place of the units-linking group of the structural unit. For example, as the raw monomers, usable are polymerizable compounds produced by introducing a polymerizable group into the bonding position of the linking group of the first atomic group described in the section of the first structural unit group given above, and also the second atomic group described in the section of the second structural unit group given above. The polymerizable group to be introduced into the atomic group can be appropriately selected from known polymerizable groups, and examples thereof include an ethylenically-unsaturated group such as a vinyl group, an acryloyloxy group, a methacryloyloxy group or a styrenyl group.

(Embodiments of Luminescence)

When irradiated with light, the long-persistent luminescence emitter of the present invention continues to exhibit luminescence for a long time even after the light irradiation has stopped (persistent luminescence).

Light emitted by the long-persistent luminescence emitter may be any one of fluorescence or phosphorescence, or may be both of fluorescence and phosphorescence, or may even include delayed fluorescence. The luminescence from the long-persistent luminescence emitter can include emission such that the excited electron donor structural unit and electron acceptor structural unit associate (aggregate) to form an exciplex and the exciplex emits light by radiative deactivation (exciplex luminescence). In the case where the long-persistent luminescence emitter forms an exciplex and emits light, the light emission from the long-persistent luminescence emitter may be exciplex luminescence alone, or may include light emission from the electron donor structural unit not associated with the electron acceptor structural unit, and light emission from the electron acceptor structural unit not associated with the electron donor structural unit.

The emission wavelength of the long-persistent luminescence emitter is not specifically limited, but is preferably 200 to 2000 nm. For example, the emission wavelength can be selected from a wavelength region of 400 nm or more, 600 nm or more, 800 nm or more, 1000 nm or more, or 1200 nm or more, or can also be selected from a region of 1500 nm or less, 1100 nm or less, 900 nm or less, 700 nm or less, or 500 nm or less.

The excitation light for obtaining persistent luminescence from the long-persistent luminescence emitter may be sunlight, or may be light from an artificial light source that may emit a light falling within a specific wavelength range.

The light irradiation time for obtaining persistent luminescence from the long-persistent luminescence emitter is preferably one microsecond or longer, more preferably one millisecond or longer, further preferably one second or longer, still further preferably 10 seconds or longer. With the light irradiation time, radical anions and radical cations can be generated sufficiently, and luminescence continues for a long time after the light irradiation is stopped.

[Forms of Long-Persistent Luminescence Emitter]

The form of the long-persistent luminescence emitter of the present invention is not specifically limited, and may be formed as a film such as a single film or a coating film. A film of the long-persistent luminescence emitter of the present invention can be formed in any film formation method such as a wet-process or dry-process film formation method. The solvent for use in forming the film by a wet process may be an organic solvent having a compatibility with the polymer to be a solute.

The plane shape of the film can be determined appropriately according to the intended use and may be, for example, a polygon such as squares and rectangles, a continuous shape such as circles, ellipses, ovals and semicircles or a specific pattern corresponding to a geometric pattern, a letter, or a figure.

[Measurement Method for Lowest Excited Singlet Energy Level and Lowest Excited Triplet Energy Level]

The lowest excited singlet energy level ($E_{S1}$) and the lowest excited triplet energy level ($E_{T1}$) of the organic compound for use in the present invention are measured as follows.

(1) Lowest Excited Singlet Energy Level ($E_{S1}$)

The compound targeted for measurement and mCP are co-evaporated on an Si substrate so that the concentration of the targeted compound could be 6% by weight, thereby preparing a sample having a thickness of 100 nm thereon. A fluorescence spectrum of the sample is measured at room temperature (300 K), and the emission from immediately after application of excitation light thereto up to 100 nanoseconds after the light application is accumulated to give a fluorescence spectrum, for which the emission intensity is on the vertical axis and the wavelength is on the horizontal axis. A tangent line is drawn to the rising of the photoluminescence spectrum on the short wavelength side, and the wavelength value λedge [nm] at the intersection between the tangent line and the horizontal axis is read. The wavelength value is converted into an energy value according to the following conversion expression to calculate $E_{S1}$.

$$E_{S1}\ [\text{eV}]=1239.85/\lambda\text{edge} \quad \text{Conversion Expression:}$$

For photoluminescence spectrum measurement, a nitrogen laser (MNL 200, by Lasertechnik Berlin) can be used as an excitation light source, and a streak camera (C4334, by Hamamatsu Photonics KK) can be used as a detector.

(2) Lowest Excited Triplet Energy Level ($E_{T1}$)

The same sample as that for measurement of the lowest excited singlet energy level ($E_{S1}$) is cooled to 5 [K], and the sample for phosphorescence measurement is irradiated with an excitation light (337 nm), and using a streak camera, the phosphorescence intensity thereof is measured. The emission from one millisecond after irradiation with the excitation light to 10 milliseconds after irradiation therewith is accumulated to give a phosphorescence spectrum, for which the emission intensity is on the vertical axis and the wavelength is on the horizontal axis. A tangent line is drawn to the rising of the phosphorescence spectrum on the short wavelength side, and the wavelength value λedge [nm] at the intersection between the tangent line and the horizontal axis is read. The wavelength value is converted into an energy value according to the following conversion expression to calculate $E_{T1}$.

$$E_{T1}\ [\text{eV}]=1239.85/\lambda\text{edge} \quad \text{Conversion Expression:}$$

The tangent line to the rising of the phosphorescence spectrum on the short wavelength side is drawn as follows. While moving on the spectral curve from the short wavelength side of the phosphorescence spectrum toward the maximum value on the shortest wavelength side among the maximum values of the spectrum, a tangent line at each point on the curve toward the long wavelength side is taken into consideration. With rising thereof (that is, with increase in the vertical axis), the inclination of the tangent line increases. The tangent line drawn at the point at which the inclination value has a maximum value is referred to as the tangent line to the rising on the short wavelength side of the phosphorescence spectrum.

A maximum point having a peak intensity of 10% or less of the maximum peak intensity of the spectrum is not included in the maximum value on the above-mentioned shortest wavelength side, and a tangent line drawn at a point which is the closest to the maximum value on the shortest wavelength side and at which the inclination value takes a maximum value is the tangent line to the rising on the short wavelength side of the phosphorescence spectrum.

<Long-Persistent Luminescent Device>

The long-persistent luminescent device of the present invention has the long-persistent luminescence emitter of the present invention on a support. Generally, the long-persistent luminescence emitter is formed as a film on a support. The film to be formed on a support may be a single film or may be composed of plural films. The polymer contained in the film may be one kind or two or more kinds.

The support is not particularly limited and may be any support which is usually used for long-persistent luminescence emitters. Examples of the material of the support include paper, metals, plastics, glass, quartz, and silicon. Because the film can be formed also on a flexible support, various shapes can be employed according to the application.

The long-persistent luminescent film is preferably entirely covered with a sealant. As the sealant, a transparent material which has low water or oxygen permeability, such as glass or epoxy resins, can be used.

According to the present invention, a transparent long-persistent luminescent composition can be provided. Accordingly, unlike conventional inorganic materials, the long-persistent luminescent composition can be used and applied for various applications. For example, when the transparent long-persistent luminescent composition of the invention is sandwiched between two supports made of a transparent material such as glass, a transparent long-persistent luminescent plate can be formed. When the transparency of the supports is controlled, a semitransparent long-persistent luminescent plate can be also provided.

[Use of Long-Persistent Luminescence Emitter]

The long-persistent luminescence emitter of the present invention is, as described above, characterized by a long-life charge separation state and a long persistent luminescence duration time, and in addition, for example, by merely mixing the polymer containing an electron donor structural unit and an electron acceptor structural unit in a predetermined ratio in a solvent and by applying the resulting solution to a support, a long-persistent luminescence emitter product can be produced. Accordingly, while inorganic long-persistent luminescent materials constitute a long-persistent luminescent product through steps of firing of the inorganic materials containing rare elements at a high temperature, formation into fine particles and dispersion, the long-persistent luminescent composition of the present invention has the following advantages over the inorganic long-persistent luminescent materials: preparation of materials is easy; the production costs of the long-persistent luminescent product can be kept low, and transparency, flexibility and softness can be given to the long-persistent luminescent product. Thus, the long-persistent luminescence emitter of the invention can achieve entirely new applications, in addition to the use as a general long-persistent luminescent product, making use of the characteristics.

For example, the long-persistent luminescence emitter of the present invention secures a long-life charge separation state, and therefore can be applied to the field of artificial photosynthesis where a charge separation state is formed by light energy to introduce production of substances. In addition, the long-persistent luminescence emitter of the present invention can be effectively used as a device responsive to thermal energy or mechanical energy. An example of the device responsive to thermal energy is thermal switching in which the long-persistent luminescence emitter is brought into the charge separation state by applying excitation light and then caused to emit light momentarily by heating the long-persistent luminescence emitter. Examples of the device responsive to mechanical energy include a device which emits light when mechanical energy such as pressure is applied to the long-persistent luminescence emitter which has been made to be in a charge separation state, and a device whose luminescence state changes when mechanical energy such as pressure is applied to the long-persistent luminescence emitter which has been made to be in a charge separation state. Application examples thereof include an interactive emission art that responds to external stimuli such as heat.

A long-persistent luminescent paint which can be excellently applied can be obtained by dissolving the long-persistent luminescent composition of the invention in a solvent. When such a long-persistent luminescent paint is applied on the entire surfaces of roads or interior surfaces of buildings, large-scale long-persistent luminescent lighting which does not require any power source can be obtained. When edge lines of roads are drawn with the long-persistent luminescent paint, the edge lines can be recognized also in the dark, and the safety of traffics can be improved significantly.

Moreover, when safety guidance signs drawn with the long-persistent luminescent paint are used, safe escape guidance can be achieved for a long time during a disaster. An escape system for a disaster can be constructed by coating energy-saving lights, housing materials, railroads, mobile devices or the like with the long-persistent luminescent paint.

A long-persistent luminescent paint containing the long-persistent luminescence emitter of the present invention can also be used as printing ink. As a result, prints with excellent designs which can be used also for guidance in the dark or during a disaster can be obtained. Such ink for long-persistent luminescent printing can be preferably used, for example, for printing for covers, packages, posters, POP, stickers, signboards, escape guidance signs, safety goods and crime prevention goods.

A long-persistent luminescent molded article can be produced using a composition produced by adding a commercial semiconducting polymer to the long-persistent luminescence emitter of the present invention.

Examples of such a long-persistent luminescent molded article include lighted signs, product displays, liquid crystal back lights, lighting displays, covers for lighting fixtures, traffic signs, safety signs, parts for improving night visibility, signboards, screens, automobile parts such as reflecting plates and meter parts, equipment and toys in amusement facilities and mobile devices such as laptops and mobile phones, as well as sign buttons in automobiles or buildings, watch and clock dials, accessories, stationery products, sports goods, housings, switches and buttons in the field of various electric, electronic and OA devices and the like.

Because the transparency of the long-persistent luminescence emitter of the invention is excellent, a window for lighting control having the long-persistent luminescence properties can be obtained by coating a surface of glass with the long-persistent luminescence emitter or forming a thin plate with a blend of the long-persistent luminescence emitter and a resin. Moreover, when a thin plate made of the long-persistent luminescence emitter and a reflecting plate are laminated, a long-persistent luminescent plate with high brightness can be obtained. Such a long-persistent luminescent plate can be used as a luminescent guiding tile for parts for evacuation routes for disasters, plates for stairs, risers, frame materials, ditch cover materials, parts for open parking lots, maintenance parts for harbors, safety parts for road facilities, scaffold parts for works at high places, scaffold parts for facilities floating in the sea, parts related to trails in mountains, salt damage resistant weather resistant signboards.

By coating fibers with the long-persistent luminescence emitter of the present invention, long-persistent luminescent fibers, fabrics using the fibers and long-persistent luminescent clothes can be obtained. Such long-persistent luminescent fiber products include workwear for night, hats, carpets for emergency paths, bridal clothes, tapestries, interior materials for cars and the like.

In addition, the long-persistent luminescence emitter of the present invention can constitute various materials such as long-persistent luminescent films, long-persistent luminescent tapes, long-persistent luminescent stickers, long-persistent luminescent building materials and long-persistent luminescent sprays. In all the cases, because the constituent components can be organic compounds, there is a wide choice of colors, and transparency and softness can be given to the materials. Thus, the designs, the properties as signs and the handleability can be made excellent. For example, long-persistent luminescent films can be widely used as packaging materials of escape guidance and emergency supplies.

Further, the long-persistent luminescence emitter of the present invention can be applied to other various fields of labeling materials for bioimaging, and to systems for preventing official document forgery of passports and others.

EXAMPLES

The characteristics of the invention are explained more specifically below using Examples. The materials, the contents of the treatment, the treatment procedures and the like shown below can be appropriately modified as long as the modifications do not depart from the purposes of the invention. Thus, the scope of the invention should not be construed as being limited by the specific examples shown below. For the excitation light, any of a 300-nm, 320-nm, 340 nm or 365-nm LED light having passed through a band-pass filter or through a 800-nm or longer IR cut filter was used. The photoluminescence spectra, the long-persistent luminescence spectra and the emission lifetime were measured using a spectrometer (PMA-12, by Hamamatsu Photonics KK), a photomultiplier tube (C13366-1350GA, by Hamamatsu Photonics KK), and a multimeter (34461A, by Keysight Technologies. The LUMO level was measured through cyclic voltammetry using N,N-dimethylformamide as a solvent.

The glass transition temperature of the polymer was measured with a differential scanning calorimeter (DSC-25, by Waters Corporation), and the thermal decomposition temperature thereof was with a thermogravimetric apparatus (TGA-55 by Waters Corporation).

[Polymer Used in Example]

The structure of the polymer used in Example is shown below. In polymer 1, the structural unit parenthesized by n corresponds to "electron donor structural unit", and the structural unit parenthesized by m corresponds to "electron acceptor structural unit".

Polymer 1

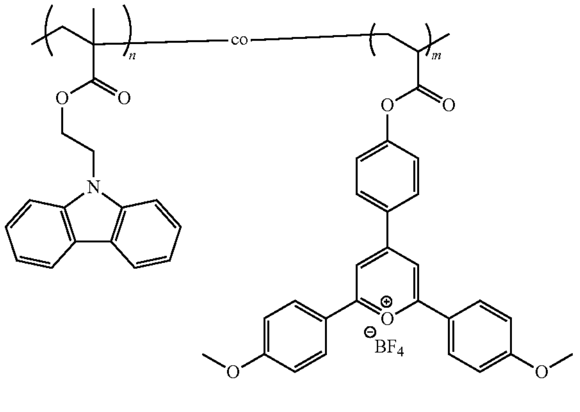

(Synthesis Example 1) Synthesis of Polymer 1

First, an electron accepting monomer $M_A$ was synthesized in the following two reactions.

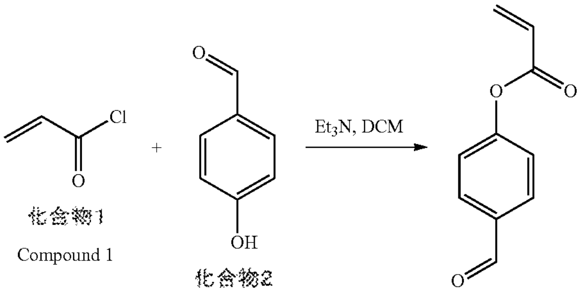

化合物1
Compound 1

化合物2
Compound 2

化合物3
Compound 3

A compound 1 (1.81 g, 20 mmol) and a compound 2 (2.44 g, 20 mmol) were dissolved in dichloromethane (50 mL), and at 0° C., triethylamine (3.03 g, 20 mmol) was added thereto. The mixture was restored to room temperature, and then reacted overnight. The reaction solution was filtered, washed with an aqueous sodium carbonate solution, and then the organic layer was concentrated. The concentrate was purified through column chromatography using a mixed solution of ethyl acetate/petroleum ether=1/5 as an eluent to give a compound 3. The yield was 3.17 g, 90%.

$^1H$ NMR (300 MHz, $CDCl_3$): δ 9.99 (s, 1H), 7.92 (m, 2H), 7.31 (m, 2H), 6.61 (dd, 1H), 6.34 (dd, 1H), 6.05 (dd, 1H).

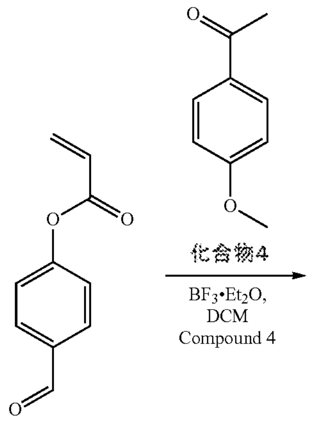

化合物3

Compound 3

-continued

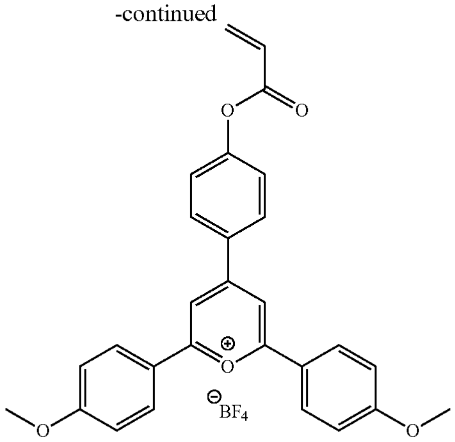

モノマーMA

Monomer $M_A$

To a solution prepared by dissolving a compound 3 (1.76 g, 10 mmol) and a compound 4 (3.94 g, 26.2 mmol) in dewatered dichloromethane, boron trifluoride diethyl ether complex (3.4 mL, 27 mmol) was gradually added at room temperature, and stirred at 50° C. for 24 hours. The reaction solution was restored to room temperature, and diethyl ether was added to give a precipitate. The precipitate was taken out by filtration, recrystallized with glacial acetic acid, and then recrystallized with dichloromethane and ether to give the monomer $M_A$. The yield was 500 mg, 11%.

$^1$H NMR (300 MHz, DMSO-$d_6$): δ 8.91 (s, 2H), 8.61 (d, 2H), 8.53 (d, 4H), 7.62 (d, 2H), 7.30 (d, 4H), 6.50-6.66 (m, 2H), 6.23-6.27 (m, 1H), 3.97 (s, 6H)

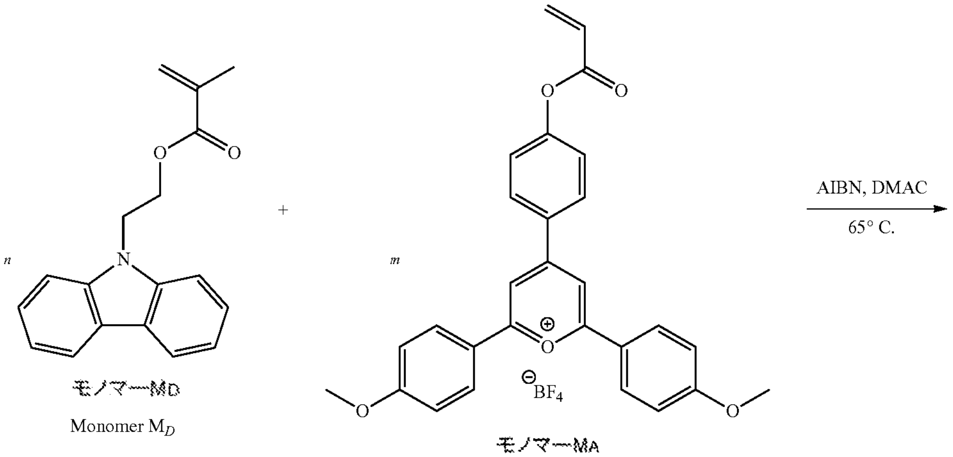

モノマーMD

Monomer $M_D$

モノマーMA

Monomer $M_A$

-continued

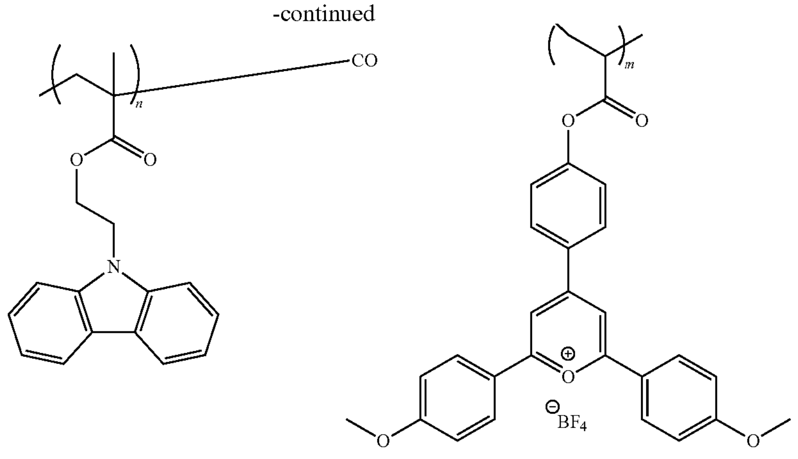

ポリマー1

Polymer 1

The monomer MD (25 mg), the monomer $M_A$ (500 mg) and azobisisobutyronitrile (AIBN) (2.5 mg) were dissolved in dewatered dimethylacetamide (DMAc), and stirred at 65° C. in nitrogen for 10 hours. Ether was added to the reaction solution, and the formed precipitate was collected by centrifugation and dewatered and dried to give the intended polymer 1. The average molecular weight of the polymer was determined from standard polystyrene in size extrusion chromatography, and was 6.0 kg/mol.

(Example 1) Evaluation of Polymer 1

The glass transition temperature Tg of the polymer 1 was 137° C., and the thermal decomposition temperature thereof was 270° C.

The polymer 1 was softened by heating at 250° C. and pressed with a thermal pressing machine to give a film of the polymer 1.

Figure 2:
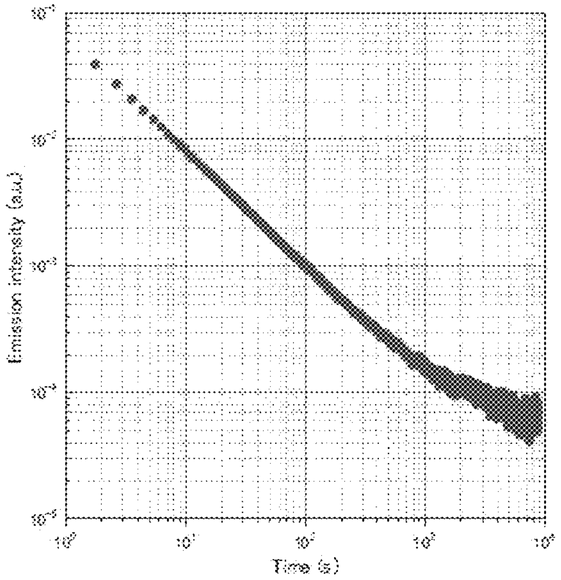
FIG. 2 A double logarithmic graph showing emission decay behavior of the polymer.

Using 365-nm excitation light, the film was analyzed to measure the photoluminescence spectrum (PL) thereof in a steady state and the long-persistent luminescence spectrum (LPL) thereof in 10 seconds after stopping irradiation with the excitation light, which are shown in FIG. 1. FIG. 2 is a double logarithmic graph showing a relationship between the emission intensity (vertical axis) and the time (horizontal axis) after stopping light irradiation.

As shown in FIG. 1, light emission from the film of the polymer 1 was recognized in 100 seconds after stopping light irradiation (persistent luminescence). Also as shown in FIG. 2, the double logarithmic graph showing the time change of the emission intensity exhibits a clear power law decay. From this, the polymer 1 is recognized as a long-persistent luminescence emitter.

INDUSTRIAL APPLICABILITY

The long-persistent luminescence emitter of the present invention can realize long-persistent luminescence emission with a single kind of polymer. The long-persistent luminescence emitter of the type can be readily formed into a film in an ordinary film formation method or wet-process method, and can therefore enhance the production efficiency of long-persistent luminescent device, and can contribute toward realization of low-cost and wide-application long-persistent luminescent devices. Consequently, the industrial applicability of the long-persistent luminescence emitter of the present invention is great.

The invention claimed is:

1. A long-persistent luminescence emitter that emits light for 0.1 seconds or longer after stopping light irradiation of the long-persistent luminescence emitter;
- wherein the long-persistent luminescence emitter contains a polymer that contains, relative to a total molar amount of an electron donor structural unit and an electron acceptor structural unit therein, 70 mol % or more of an electron donor structural unit and less than 30 mol % of an electron acceptor structural unit, or contains a polymer that contains, relative to a total molar amount of an electron donor structural unit and an electron acceptor structural unit therein, 70 mol % or more of an electron acceptor structural unit and less than 30 mol % of an electron donor structural unit, wherein:
- an energy level of HOMO of the electron donor structural unit is higher than that of the electron acceptor structural unit,
- an electron transfer from the electron donor structural unit to the electron acceptor structural unit occurs by light irradiation of the long-persistent luminescence emitter, and
- an emission decay after stopping light irradiation of the long-persistent luminescence emitter is a power law decay.

2. The long-persistent luminescence emitter according to claim 1, wherein the polymer is a random copolymer.

3. The long-persistent luminescence emitter according to claim 1, wherein the electron donor structural unit contains a diarylamine structure.

4. The long-persistent luminescence emitter according to claim 1, wherein the electron donor structural unit contains a substituted or unsubstituted carbazolyl group.

5. The long-persistent luminescence emitter according to claim 1, wherein the electron acceptor structural unit contains a π-electron-deficient aromatic heterocycle.

6. The long-persistent luminescence emitter according to claim 1, wherein the electron acceptor structural unit contains a pyrylium ring.

7. The long-persistent luminescence emitter according to claim 1, wherein the polymer contains 70 mol % or more of the electron donor structural unit and less than 30 mol % of the electron acceptor structural unit relative to the total molar amount thereof, and further contains a hole trapping structural unit.

8. The long-persistent luminescence emitter according to claim 1, wherein the polymer contains 70 mol % or more of the electron acceptor structural unit and less than 30 mol % of the electron donor structural unit relative to the total molar amount thereof, and further contains an electron trapping structural unit.

9. A long-persistent luminescent device having the long-persistent luminescence emitter of claim 1 on a support.

* * * * *